(12) United States Patent
Antonyuk et al.

(10) Patent No.: US 9,489,040 B2
(45) Date of Patent: Nov. 8, 2016

(54) INTERACTIVE INPUT SYSTEM HAVING A 3D INPUT SPACE

(75) Inventors: Viktor Antonyuk, Calgary (CA); Min Xin, Calgary (CA); Henry Lai, Calgary (CA); Edward Tse, Calgary (CA); Carl Hudson, Calgary (CA); Hui Xiu Wu, Calgary (CA); Jingwen Chen, Calgary (CA)

(73) Assignee: SMART TECHNOLOGIES ULC, Calgary (CA)

(*) Notice: Subject to any disclaimer, the term of this patent is extended or adjusted under 35 U.S.C. 154(b) by 675 days.

(21) Appl. No.: 13/810,850

(22) PCT Filed: Jul. 19, 2011

(86) PCT No.: PCT/CA2011/000816
§ 371 (c)(1),
(2), (4) Date: May 1, 2013

(87) PCT Pub. No.: WO2012/009789
PCT Pub. Date: Jan. 26, 2012

(65) Prior Publication Data
US 2013/0215148 A1    Aug. 22, 2013

Related U.S. Application Data

(60) Provisional application No. 61/365,757, filed on Jul. 19, 2010, provisional application No. 61/371,975, filed on Aug. 9, 2010, provisional application No. 61/431,850, filed on Jan. 12, 2011.

(51) Int. Cl.
*G09G 5/00* (2006.01)
*G06F 3/01* (2006.01)
(Continued)

(52) U.S. Cl.
CPC ............. *G06F 3/011* (2013.01); *G06F 3/017* (2013.01); *G06F 3/0425* (2013.01);
(Continued)

(58) Field of Classification Search
CPC .............. G02B 27/0172; G02B 2027/0138; G02B 2027/0187; G06F 3/011
USPC ........... 345/156, 158, 165, 204; 348/333.01; 343/395
See application file for complete search history.

(56) References Cited

U.S. PATENT DOCUMENTS 7,710,391 B2    5/2010  Bell et al.
2008/0151092 A1*  6/2008  Vilcovsky ............... 348/333.01
2009/0244309 A1* 10/2009  Maison et al. ........... 348/222.1
(Continued)

FOREIGN PATENT DOCUMENTS

WO    2008/156437 A1    12/2008

OTHER PUBLICATIONS

Transmittal; International Search Report; and written Opinion of the International Searching Authority for International Application No. PCT/CA2011/000816, with a mailing date of Dec. 8, 2011.

*Primary Examiner* — Calvin C Ma
(74) *Attorney, Agent, or Firm* — Perkins Coie LLP

(57) ABSTRACT

An interactive input system comprises computing structure; and an input device detecting at least one physical object carrying a recognizable pattern within a three-dimensional (3D) input space and providing output to the computing structure, wherein the computing structure processes the output of the input device to: recognize the pattern carried by the at least one physical object in the 3D input space; and modify an image presented on a display surface by applying a transition to digital content associated with the at least one physical object based on a detected state of the at least one physical object.

48 Claims, 34 Drawing Sheets

(51) Int. Cl.
  *G06T 19/00*    (2011.01)
  *G06F 3/042*    (2006.01)
  *G06T 7/20*     (2006.01)

(52) U.S. Cl.
  CPC .......... *G06T 7/2033* (2013.01); *G06T 19/006*
        (2013.01); *G06T 2207/10016* (2013.01); *G06T
                                  2207/30204* (2013.01)

(56) References Cited

U.S. PATENT DOCUMENTS

| | | | |
|---|---|---|---|
| 2010/0111426 A1* | 5/2010 | Chu ............................. | 382/209 |
| 2012/0059953 A1* | 3/2012 | Klappert ...................... | 709/236 |
| 2013/0127980 A1* | 5/2013 | Haddick et al. ........... | 348/14.08 |
| 2013/0314303 A1* | 11/2013 | Osterhout .............. | G06F 3/005 |
| | | | 345/8 |

* cited by examiner

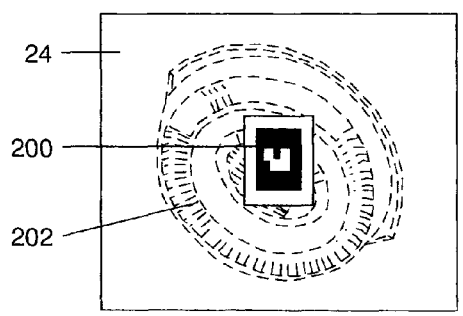 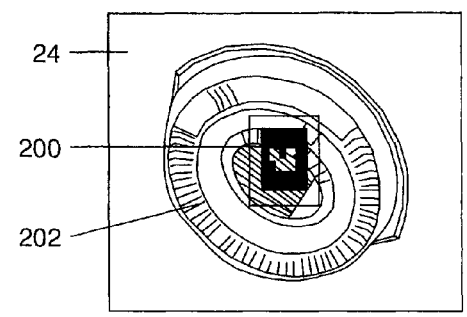
FIG. 4A  FIG. 4B
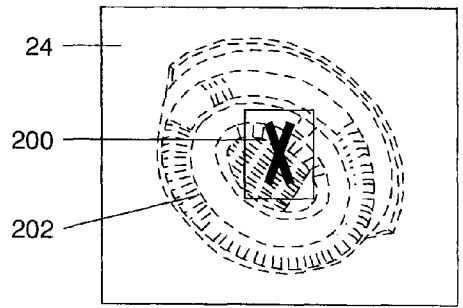 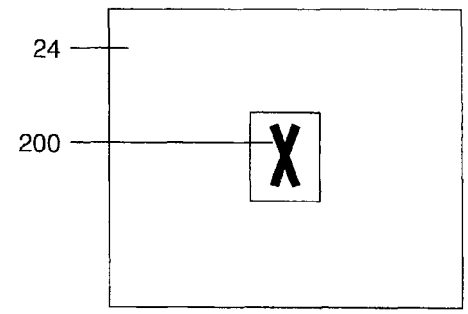
FIG. 4C  FIG. 4D

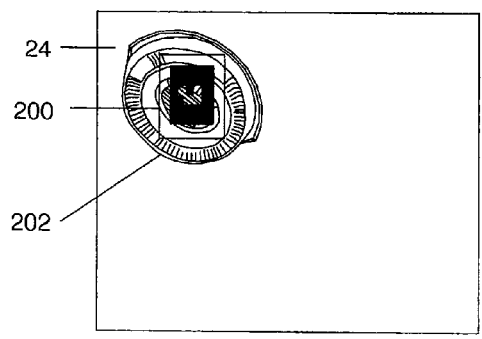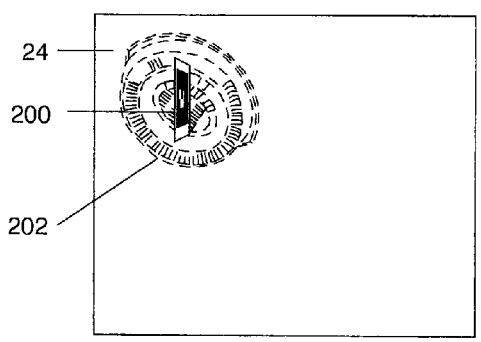
FIG. 5A  FIG. 5B
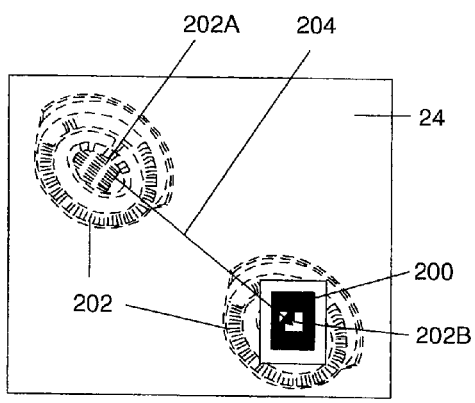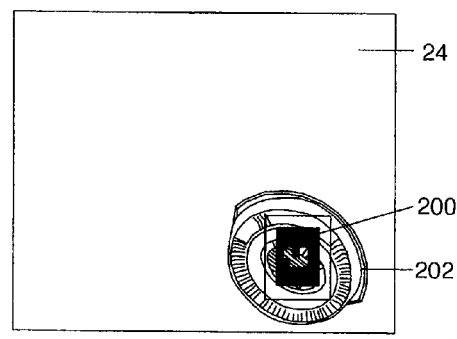
FIG. 5C  FIG. 5D

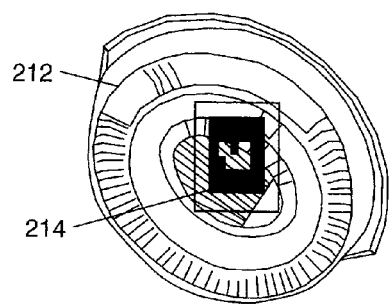
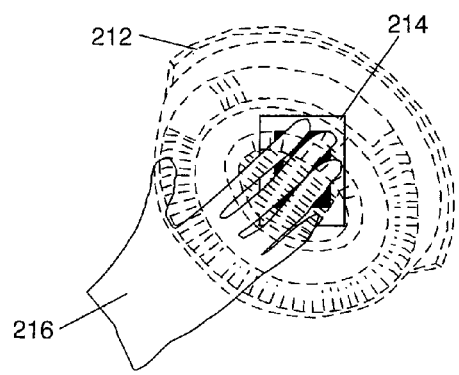
FIG. 7A  FIG. 7B
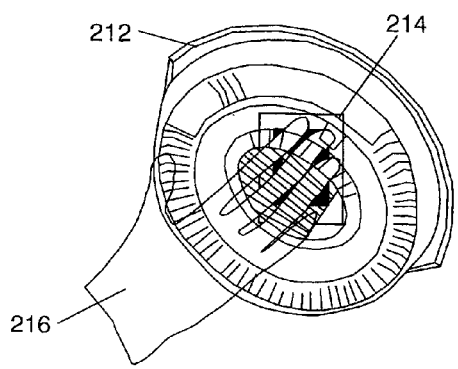
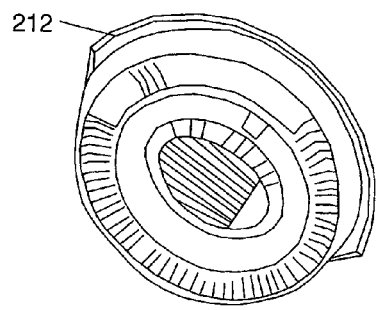
FIG. 7C  FIG. 7D

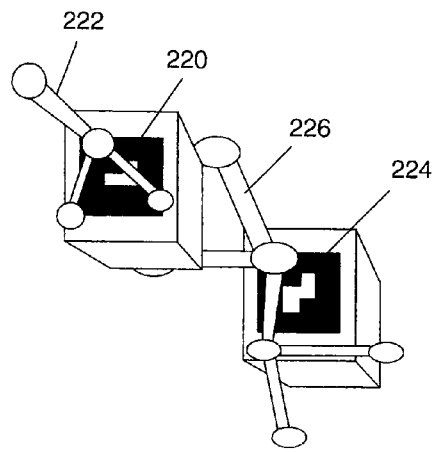
FIG. 8A
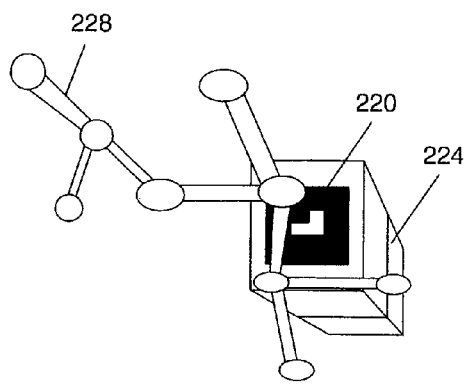
FIG. 8B
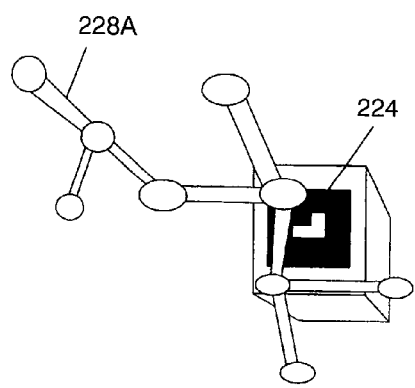 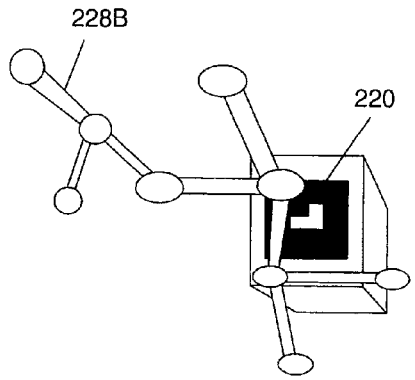
FIG. 8C

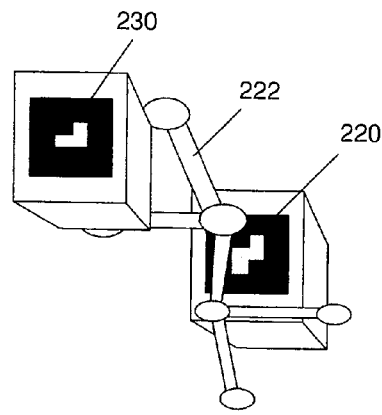
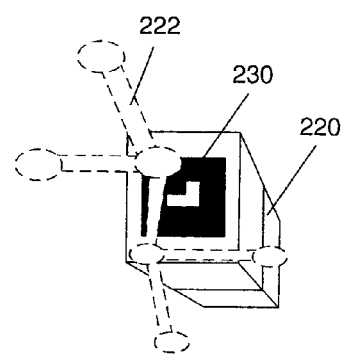
FIG. 9A                FIG. 9B
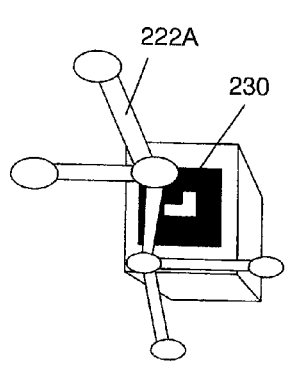
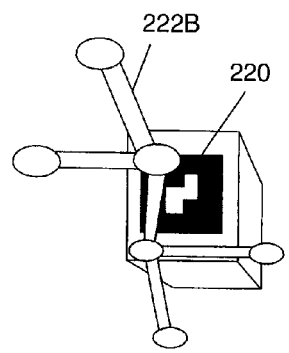
FIG. 9C

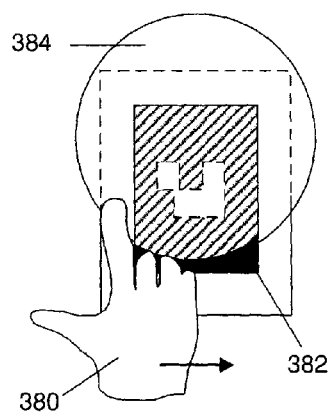
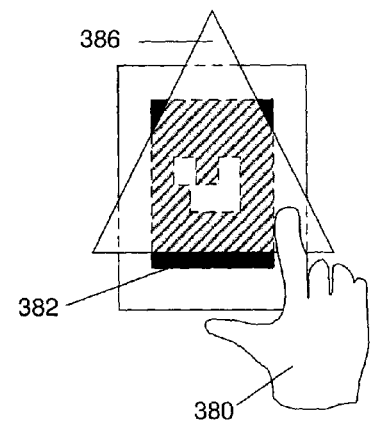
FIG. 12D  FIG. 12E
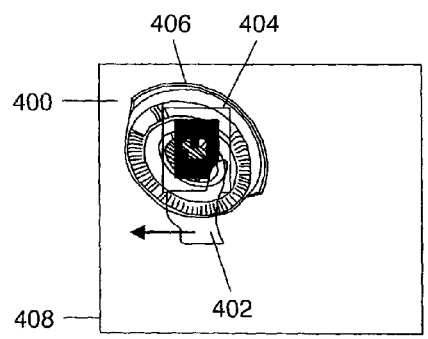
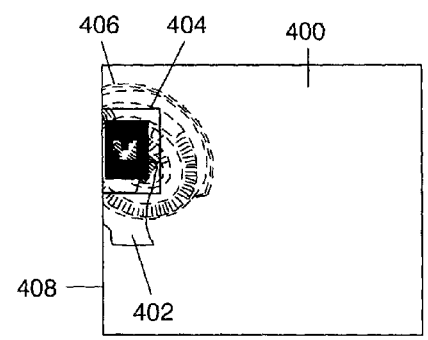
FIG. 13A  FIG. 13B
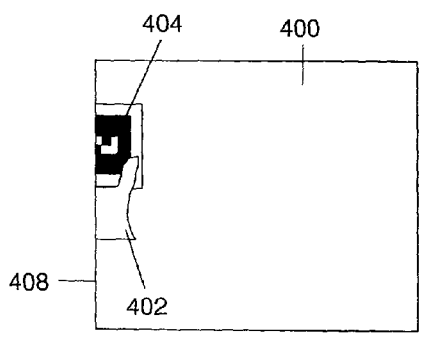
FIG. 13C

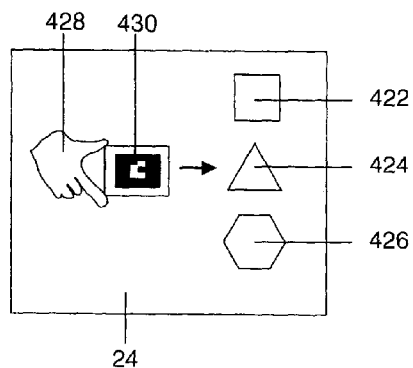
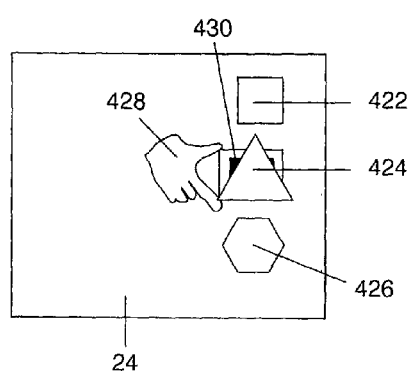
FIG. 14A  FIG. 14B
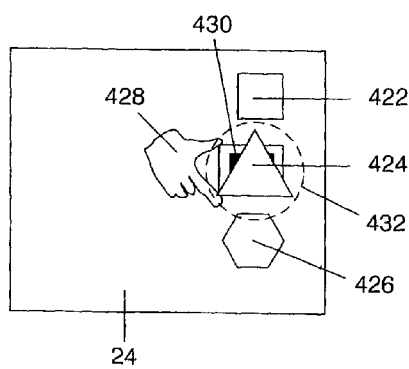
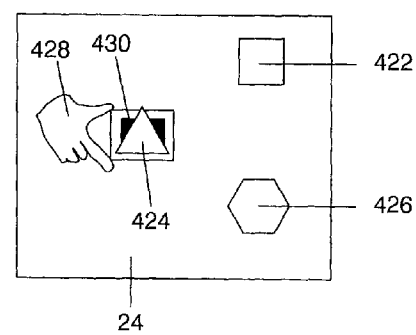
FIG. 14C  FIG. 14D

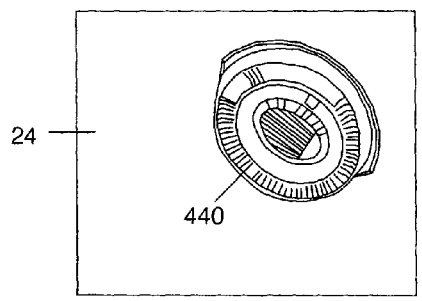
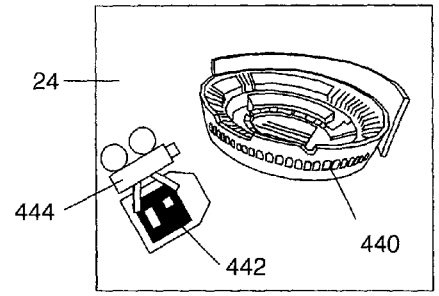
FIG. 15A  FIG. 15B
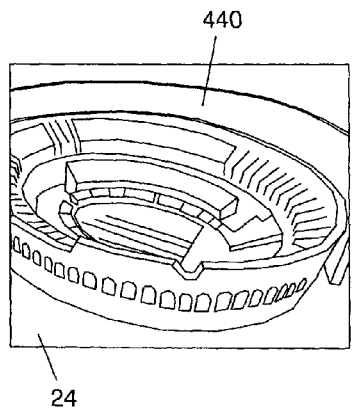
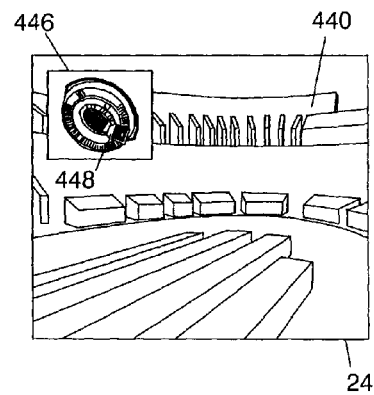
FIG. 15C  FIG. 15D
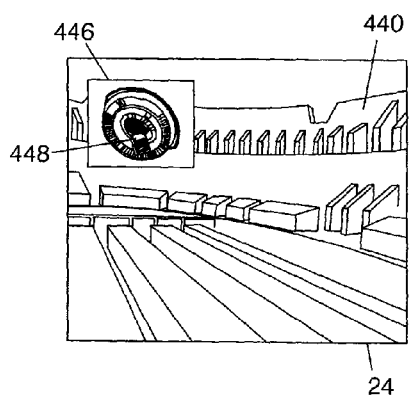
FIG. 15E

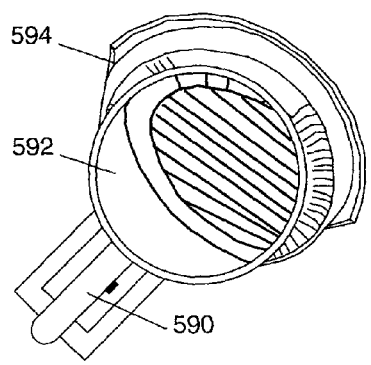
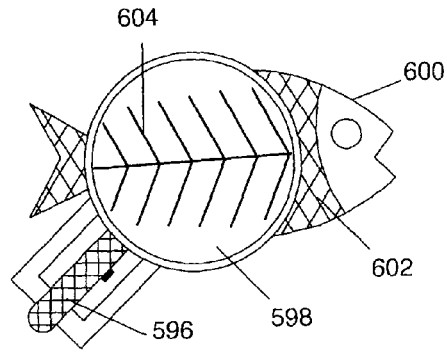
FIG. 24A  FIG. 24B
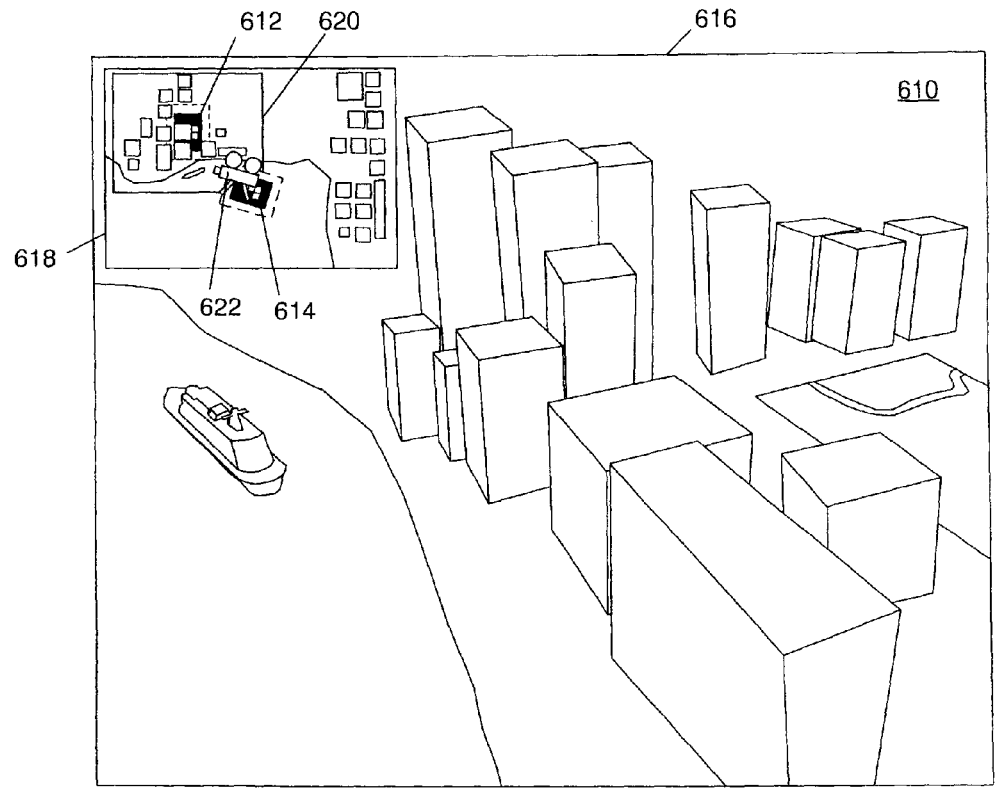
FIG. 25

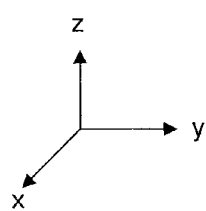
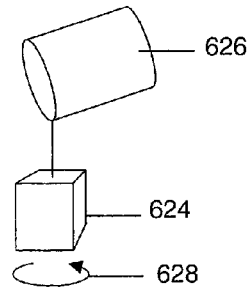
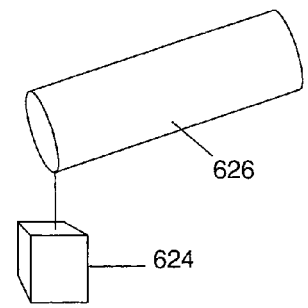
FIG. 26A     FIG. 26B     FIG. 26C
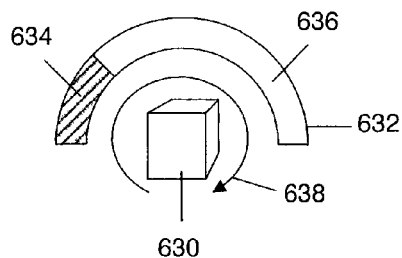
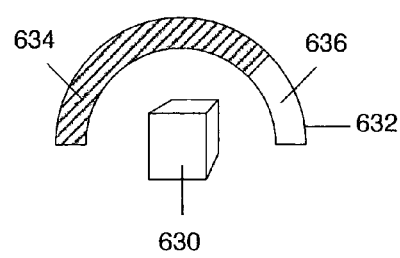
FIG. 26D     FIG. 26E
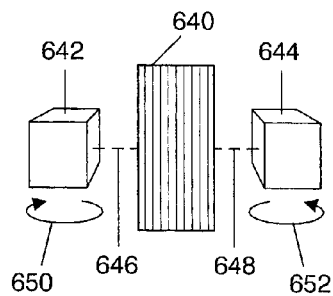
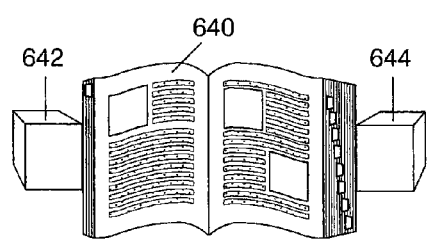
FIG. 27A     FIG. 27B

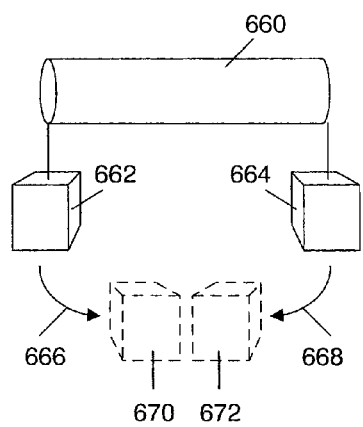
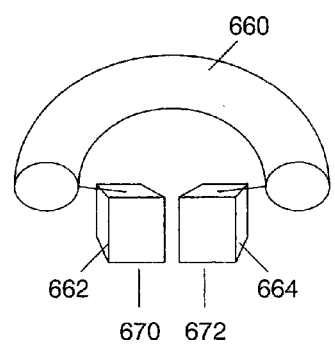
FIG. 28A    FIG. 28B
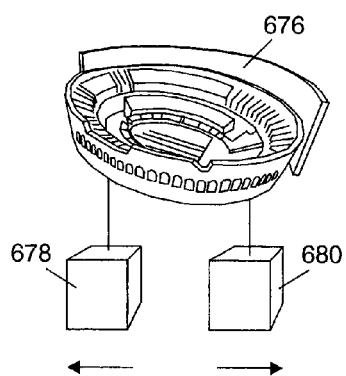
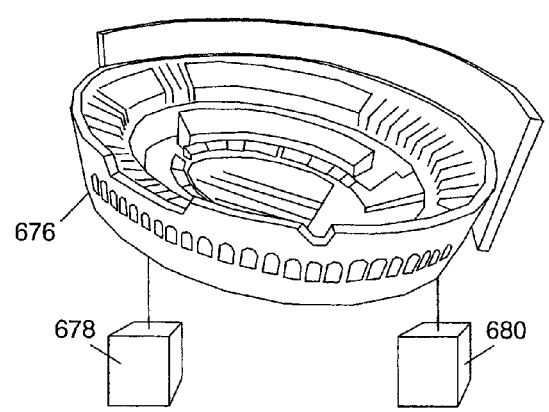
FIG. 29A    FIG. 29B

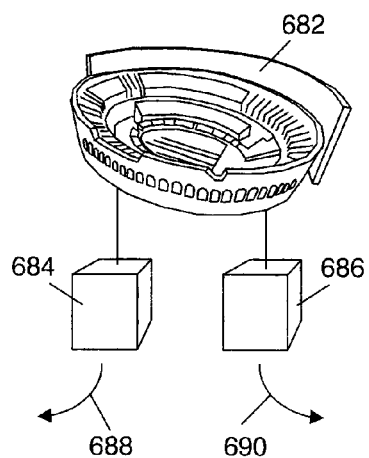
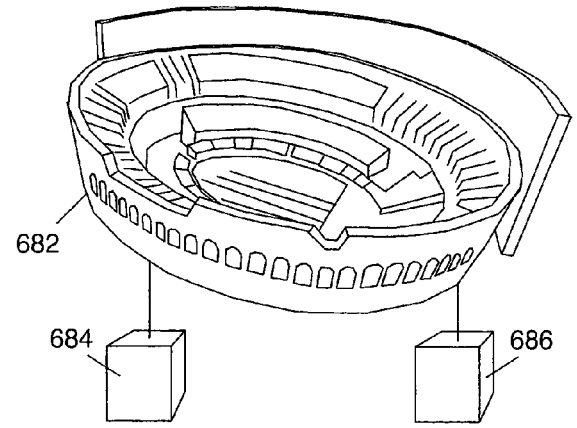
FIG. 30A  FIG. 30B
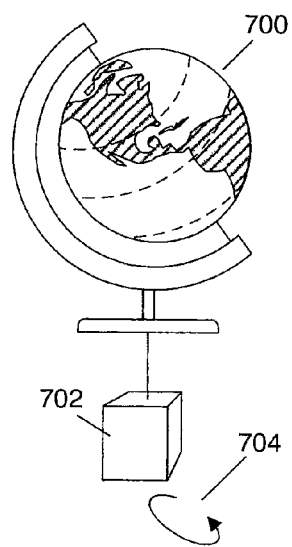
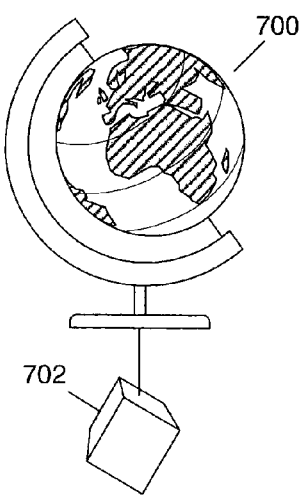
FIG. 31A  FIG. 31B

INTERACTIVE INPUT SYSTEM HAVING A 3D INPUT SPACE

CROSS-REFERENCE TO RELATED APPLICATIONS

This application claims the benefit of U.S. Provisional Application No. 61/365,757 to Antonyuk et al. filed on Jul. 19, 2010 for an invention entitled "Interactive Input System Having A 3D Input Space"; U.S. Provisional Application No. 61/371,975 to Xin et al. filed on Aug. 9, 2010 for an invention entitled "Interactive Input System Having A 3D Input Space"; and U.S. Provisional Application No. 61/431,850 to Tse et al. filed on Jan. 12, 2011 for an invention entitled "Interactive Input System Having 3D Input Space", the entire disclosures of which are incorporated herein by reference.

FIELD OF THE INVENTION

The following generally relates to interactive input systems and in particular, to an interactive input system having a three-dimensional (3D) input space and to visual compensation methods, 3D tools and gestures for interacting in mixed reality environments.

BACKGROUND OF THE INVENTION

Mixed reality (MR) or augmented interactive input systems are known in the art. Some existing augmented interactive input systems make use of a document camera to track and image physical objects such as cubes and flashcards that comprise recognizable patterns. Digital content is superimposed on top of the images captured by the document camera and the digital content and images are presented on a display. The direct association of the physical objects to digital content allows users to manipulate the digital content through manipulation of the physical objects. Unfortunately, these augmented interactive input systems have only permitted the position and orientation of physical objects to be tracked. As a result, user manipulations of digital content in this scenario have been limited to translations and rotations of physical objects. By only permitting the position and orientation of the physical objects to be tracked, interactions such as selecting or clicking a button or opening a menu have been difficult to realize without use of an external device such as a mouse or keyboard.

Another problem that occurs in existing augmented interactive input systems is the temporary loss of physical objects that are being tracked. When an augmented interactive input system loses track of a physical object and then regains tracking of the physical object, the associated digital content shown on the display disappears and then quickly re-appears, causing unwanted flickering.

The publication entitled "Occlusion based Interaction Methods for Tangible Augmented Reality Environments," authored by Lee et al. and published in the Proceedings of the 2004 ACM SIGGRAPH international conference on Virtual Reality continuum and its applications in industry (pages 419-426, 2004), discloses an occlusion based interaction system and method for interacting with two-dimensional (2D) digital objects in a camera-based tangible augmented reality environment. A marker comprising a set of patterns is imaged by a camera, and patterns on the marker are recognized. When a user uses a finger to manipulate the marker and the finger occludes at least one pattern on the marker, the interaction system determines which pattern has been occluded, and then performs a 2D action (e.g., clicking a button or opening a menu) accordingly. Because multiple patterns are required, either the marker has to be sufficiently large so as to accommodate the patterns, making the marker, as a physical object, difficult to manipulate, or the patterns have to be small, which may increase the failure rate of pattern recognition.

The publication entitled "The Bubble Cursor: Enhancing Target Acquisition by Dynamic Resizing of the Cursor's Activation Area," by Grossman, et al. and published in CHI 2005 Conference Proceedings: ACM Conference on Human Factors in Computing Systems, pages 281-290, discloses a bubble cursor used on a 2D graphic user interface (GUI). The bubble cursor has a circle shape, and captures the target whose border is closest to the cursor's center.

Although mixed reality or augmented interactive input systems have been considered, improvements in mixed reality or augmented interactive input systems are desired. It is therefore an object of the following to provide a novel interactive input system having a three-dimensional input space, and novel visual compensation methods, 3D tools and gestures for interacting in mixed reality environments.

SUMMARY OF THE INVENTION

Accordingly, in one aspect there is provided an interactive input system comprising: computing structure; and an input device detecting at least one physical object carrying a recognizable pattern within a three-dimensional (3D) input space and providing output to said computing structure, wherein said computing structure processes the output of the input device to: recognize the pattern carried by the at least one physical object in the 3D input space; and modify an image presented on a display surface by applying a transition to digital content associated with the at least one physical object based on a detected state of the at least one physical object.

According to another aspect there is provided an apparatus comprising: a processing device receiving data representing a physical object carrying a recognizable pattern positioned within a three-dimensional (3D) input space; and memory storing computer program code executable by the processing device, the processing device communicating with the memory and executing the program code causing the apparatus to: recognize the pattern carried by the physical object in the 3D input space; modify image data by applying a transition to digital content associated with the physical object based on a detected state of the at least one physical object; and output the modified image data for presentation on a display surface.

According to another aspect there is provided a method comprising: detecting a physical object carrying a unique pattern within a three-dimensional input space; recognizing the physical object based on the unique pattern carried thereby; and modifying image data used to present an image on a display surface based on a detected state of the physical object, wherein said modifying comprises applying a transition effect to digital content associated with the physical object.

According to another aspect there is provided an interactive input system comprising: computing structure; and an input device detecting at least one physical object carrying a recognizable pattern within a three-dimensional (3D) input space and providing output to said computing structure, wherein said computing structure processes the output of the input device to: recognize the pattern carried by the at least one physical object in the 3D input space; determine when the location of the pattern within the 3D input space and the location of digital content in an image presented on a display surface satisfy defined criteria; and associate the pattern to the digital content.

According to another aspect there is provided an apparatus comprising: a processing device receiving data representing a physical object carrying a recognizable pattern positioned within a three-dimensional (3D) input space; and memory storing computer program code executable by the processing device, the processing device communicating with the memory and executing the program code causing the apparatus to: recognize the pattern carried by the at least one physical object in the 3D input space; determine when the location of the pattern within the 3D input space and the location of digital content in an image presented on a display surface satisfy defined criteria; and associate the pattern to the digital content.

According to another aspect there is provided a method comprising: detecting a physical object carrying a unique pattern within a three-dimensional input space; recognizing the physical object based on the unique pattern carried thereby; determining when the location of the pattern within the input space and the location of digital content within a presented image satisfy defined criteria; and associating the pattern to the digital content so that manipulation of the physical object within the input space manipulates the digital content.

According to another aspect there is provided an interactive input system comprising: computing structure; and an input device detecting at least two physical objects, each carrying a recognizable pattern, within a three-dimensional (3D) input space and providing output to said computing structure, wherein said computing structure processes the output of the input device to: recognize the patterns carried by the at least two physical objects in the 3D input space; and associate the patterns to the same digital content.

According to another aspect there is provided an apparatus comprising: a processing device receiving data representing at least two physical objects, each carrying a recognizable pattern, positioned within a three-dimensional (3D) input space; and memory storing computer program code executable by the processing device, the processing device communicating with the memory and executing the program code causing the apparatus to: recognize the patterns carried by the at least two physical objects in the 3D input space; and associate the patterns to the same digital content.

According to another aspect there is provided an interactive input system comprising: computing structure; and an input device detecting a physical object carrying a recognizable pattern within a three-dimensional (3D) input space and providing output to said computing structure, wherein said computing structure processes said output of said input device to: recognize said pattern carried by said physical object in said 3D input space; determine which digital content object in a presented image is closest to a marker associated with said physical object that is in said image; and select the digital content object closest to said marker to associate the digital content object with said marker.

According to another aspect there is provided a method comprising: detecting a physical object carrying a unique pattern within a three-dimensional (3D) input space; recognizing said physical object based on said unique pattern carried thereby; determining when said physical object is positioned within said 3D input space at a location to position a corresponding marker within a threshold distance of at least one digital content object in an image; determining the velocity of said marker; and selecting at least one of said digital content objects to associate with said marker when said velocity is less than a velocity threshold, and when said at least one of said digital content objects is within said threshold distance from said marker, whereby manipulation of said physical object within said 3D input space manipulates at least one of said digital content objects.

According to another aspect there is provided an interactive input system comprising: computing structure; and an input device detecting at least one physical object carrying a recognizable pattern within a three-dimensional (3D) input space and providing output to said computing structure, wherein said computing structure processes the output of the input device to: recognize the pattern carried by the at least one physical object in the 3D input space; detect manipulation of the at least one physical object in the 3D input space; recognize gestures in response to detected physical object manipulations; and manipulate digital content associated with the physical object in response to detected gestures.

BRIEF DESCRIPTION OF THE DRAWINGS

Embodiments will now be described more fully with reference to the accompanying drawings in which:

FIGS. 4A to 4D illustrate transition effects applied to digital content in response to manipulation of a physical object positioned in the 3D input space;

FIGS. 5A to 5D illustrate smoothing effects applied to digital content in response to manipulation of a physical object positioned in the 3D input space;

FIGS. 7A to 7D illustrate manipulation of a physical object positioned in the 3D input space to execute a covering gesture;

FIGS. 8A to 8C illustrate manipulation of physical objects positioned in the 3D input space to execute a stacking gesture;

FIGS. 9A to 9C show cloning of digital content using the stacking gesture;

FIGS. 12A to 12E illustrate manipulation of a physical object positioned in the 3D input space to execute a finger swipe gesture, and an example of using the finger swipe gesture;

FIGS. 13A to 13C illustrate manipulation of a physical object positioned in the 3D input space to execute a clipping planes gesture;

FIGS. 14A to 14D illustrate manipulation of a physical object positioned in the 3D input space to execute a hovering gesture;

FIGS. 15A to 15E illustrate a virtual camera fly-through method for viewing the interior of digital content;

FIG. 24A illustrates manipulation of a physical object positioned in the 3D input space to zoom a portion of digital content;

FIG. 24B illustrates manipulation of a physical object positioned in the 3D input space to expose a second layer of digital content;

FIG. 25 illustrates manipulation of two physical objects positioned in the 3D input space to view a portion of digital content;

FIGS. 26A to 26E illustrate a rotation method for modifying characteristics of digital content based on the rotation axis of a physical object positioned in the 3D input space;

FIGS. 27A and 27B illustrate an alternative rotation method for opening an ebook in response to rotation of two physical objects positioned in the 3D input space;

FIGS. 28A and 28B illustrate manipulation of two physical objects positioned in the 3D input space to bend digital content;

FIGS. 29A and 29B illustrate manipulation of two physical objects positioned in the 3D input space to zoom digital content;

FIGS. 30A to 31B show examples where restrictions are applied when manipulating digital content using physical objects positioned in the 3D input space;

DETAILED DESCRIPTION OF THE EMBODIMENTS

Figure 1A:
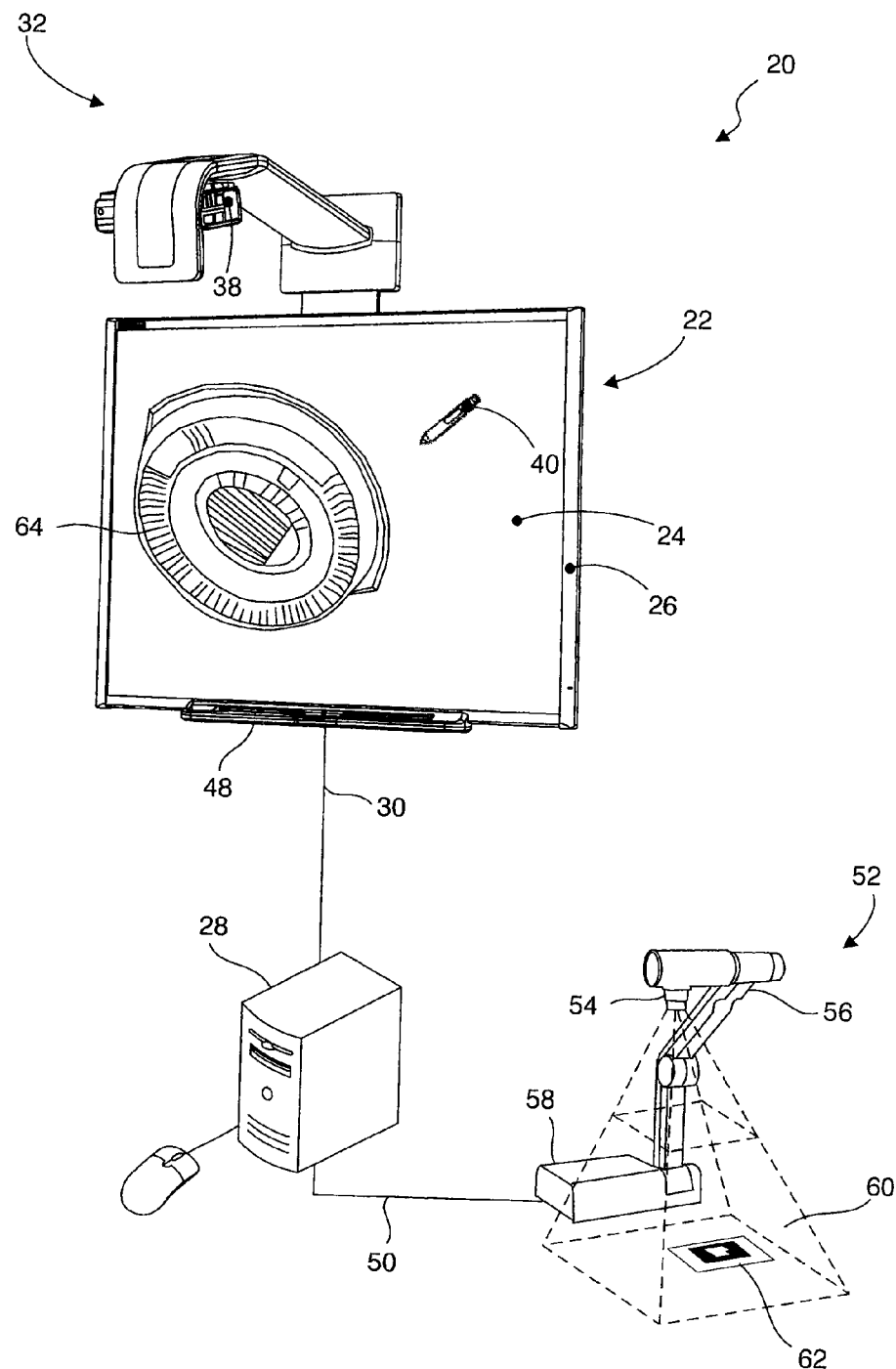
FIG. 1A is a perspective diagram of an interactive input system having a three-dimensional (3D) input space.

Turning now to FIG. 1A, an interactive input system having a three-dimensional (3D) input space is shown and is generally identified by reference numeral 20. Interactive input system 20 allows a user to inject input such as digital ink, mouse events, commands, etc. into an executing application program. In this embodiment, interactive input system 20 comprises a two-dimensional (2D) input device in the form of an interactive board 22 mounted on a vertical support surface such as for example, a wall surface or the like. Interactive board 22 comprises a generally planar, rectangular interactive surface 24 that is surrounded about its periphery by a bezel 26. A boom assembly 32 is also mounted on the support surface above the interactive board 22. Boom assembly 32 supports a short-throw projector 38 such as that sold by SMART Technologies ULC of Calgary, Alberta, assignee of the subject application, under the name "SMART Unifi 45", which projects an image, such as for example, a computer desktop, onto the interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30 or other suitable wired or wireless communication link. Computing device 28 processes the output of the interactive board 22 and adjusts image data that is output to the projector 38, if required, so that the image presented on the interactive surface 24 reflects pointer activity. In this manner, the interactive board 22, computing device 28 and projector 38 allow pointer activity proximate to the interactive surface 24 to be recorded as writing or drawing or used to control execution of one or more application programs executed by the computing device 28.

The bezel 26 is mechanically fastened to the interactive surface 24 and comprises four bezel segments that extend along the edges of the interactive surface 24. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 24.

A tool tray 48 is affixed to the interactive board 22 adjacent the bottom bezel segment using suitable fasteners such as for example, screws, clips, adhesive etc. As can be seen, the tool tray 48 comprises a housing having an upper surface configured to define a plurality of receptacles or slots. The receptacles are sized to receive one or more pen tools 40 as well as an eraser tool (not shown) that can be used to interact with the interactive surface 24. Control buttons (not shown) are also provided on the upper surface of the tool tray housing to enable a user to control operation of the interactive input system 20.

Imaging assemblies (not shown) are accommodated by the bezel 26, with each imaging assembly being positioned adjacent a different corner of the bezel. Each of the imaging assemblies comprises an image sensor and associated lens assembly that provides the image sensor with a field of view sufficiently large as to encompass the entire interactive surface 24. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 24 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes reflected IR illumination and appears as a dark region interrupting the bright band in captured image frames.

The imaging assemblies are oriented so that their fields of view overlap and look generally across the entire interactive surface 24. In this manner, any pointer such as for example a user's finger, a cylinder or other suitable object, or a pen or eraser tool lifted from a receptacle of the tool tray 48, that is brought into proximity of the interactive surface 24 appears in the fields of view of the imaging assemblies and thus, is captured in image frames acquired by multiple imaging assemblies. When the imaging assemblies acquire image frames in which a pointer exists, the imaging assemblies convey pointer data to the computing device 28.

The general purpose computing device 28 in this embodiment is a personal computer or other suitable processing device comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computer components to the processing unit. The computing device 28 may also comprise networking capabilities using Ethernet, WiFi, and/or other suitable network format, to enable connection to shared or remote drives, one or more networked computers, or other networked devices. The computing device 28 processes pointer data received from the imaging assemblies and computes the location of any pointer proximate the interactive surface 24 using well known triangulation. The computed pointer location is then recorded as writing or drawing or used as an input command to control execution of an application program as described above.

Figure 1B:
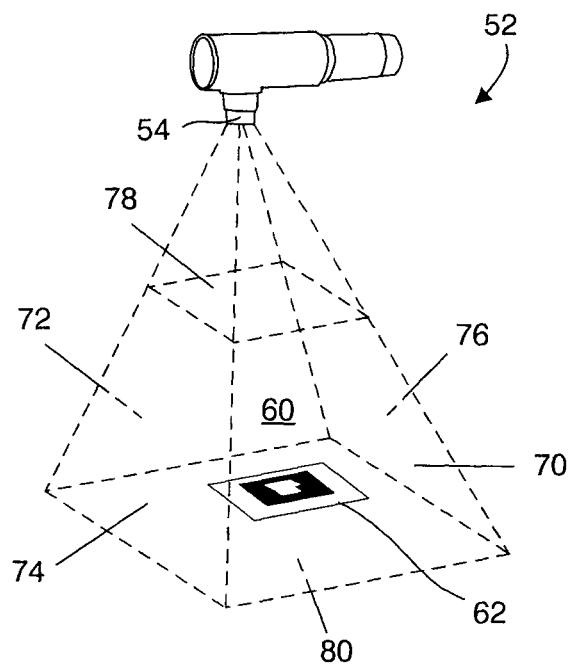
FIG. 1B is a perspective view of a 3D input device forming part of the interactive input system of FIG. 1A showing the 3D input space imaged thereby.

The interactive input system 20 also comprises a three-dimensional (3D) input device 52 that communicates with the computing device 28 via a USB cable 50. Those of skill in the art will understand that alternative wired connections, such as for example VGA, DVI, HDMI and the like or suitable wireless connections to connect the 3D input device 52 to the computing device 28 may be employed. The 3D input device 52 comprises a camera 54 mounted to a base 58 via an articulated arm 56. The camera 54 has a field of view that looks into a 3D input space 60. The 3D input space 60 defines a volume within which a physical object or marker from a set of markers may be positioned and manipulated. FIG. 1B better illustrates the 3D input space 60 together with a marker 62 from the set. For ease of illustration, only the camera 54 of the 3D input device 52 is shown. The 3D input space 60 in this embodiment takes the form of a pyramidal frustum. Thus, the 3D input space comprises six (6) boundary surfaces, i.e., front, back, left, right, top and bottom surfaces 70 to 80. These boundary surfaces, except for the bottom surface 80, may be used to define clipping planes, and used to detect a clipping plane gesture as will be described. The images captured by the camera 54 are processed by control circuitry (not shown) in the base 58 to adjust the brightness, clarity and/or resolution of the images and to convert the images into digital form, prior to being sent to the computing device 28.

In this embodiment, each marker of the set is in the form of a planar card having a pattern printed or otherwise applied to at least one surface thereof, or a cube with at least one surface having a pattern printed or otherwise applied thereto. The pattern comprises a rectangular dark or black box having an arrangement of smaller light or white blocks thereon. The arrangement of smaller white blocks on the larger black box is unique to each marker. This allows each marker to be associated with different digital content and/or with a different digital content manipulation. The digital content may be 2D or 3D digital content in various forms (e.g., an image, an animation, a 3D digital content object, a 2D digital content object, an audio clip, a video clip etc.), or a plurality of digital objects grouped together. Alternatively, in some embodiments, two or more markers may be associated with the same digital content. Still in other embodiments, some patterns on markers 62 are recognized by the computing device 28 as digital tools, which may be used to facilitate the manipulation of other digital objects. However, a digital tool may also be considered to be a digital content object when it is manipulated by other digital tools. As shown in FIG. 1A, the marker 62 positioned within the 3D input space 60 is associated with a digital content object 64 in the form of an image of a stadium or arena presented on the interactive surface 24.

When the marker 62 positioned in the 3D input space 60 is captured in an image acquired by the camera 54, after the image has been pre-processed and converted into digital form by the control circuitry in the base 58 and then conveyed to the computing device 28, the computing device 28 processes the image to recognize the pattern. Once recognized, the computing device 28 determines the digital content object 64 associated with the recognized pattern. Thereafter, the computing device 28, using a position mapping rule, combines the captured image, the digital content object 64 associated with the recognized pattern on the marker and the graphical interface of the executing application program and outputs the resultant image data to the projector 38 for presentation on the interactive surface 24. In this case, the digital content object 64 is superimposed on the captured image and graphical interface. Thus, an image comprising both the real-world and digital content is displayed on the interactive surface 24. Users of the interactive input system 20 may manipulate the marker 62, e.g., by moving, rotating or tilting the marker 62 within the 3D input space 60, to interact with and manipulate the digital content displayed on the interactive surface 24. For example, a user may rotate the marker 62 to rotate the digital content object 64 and view it from different vantage points as desired.

In order to recognize patterns on markers 62, the computing device 28 maintains a pattern library comprising pattern reference images captured during interactive input system calibration, with each pattern reference image being captured with the pattern positioned at a known z coordinate (reference point) and orientation within the 3D input space 60. In this embodiment, during pattern reference image capture, the patterns are positioned to lie in planes corresponding to the bottom plane 80 of the 3D input space 60. In order to determine the z coordinate of a marker placed in the 3D input space 60, the computing device 28 compares the size of the pattern in the pattern reference image to the size of the pattern in the image captured by the camera 54. The ratio of the sizes allows the position of the marker along the z-axis of the 3D input space 60 to be determined. For example, if the ratio is equal to one (1), signifying that the size of the pattern in the pattern reference image and the size of the pattern in the image captured by the camera 54 are the same, the z coordinate of the marker is determined to coincide with the bottom plane 80. The computing device 28 also calculates the marker's angle of rotation by comparing the direction of the pattern of the marker in the captured image to the pattern reference image, and calculates the angle of tilting based on the perspective distortion of the pattern in the captured image. In this embodiment, the top clipping plane 78 is defined as an x-y plane at a location along the z-axis at which the image of the pattern captured by the camera 54 substantially occupies the entire field of view of the camera 54.

Those skilled in the art will appreciate that other definitions of the 3D input space 60 and the reference point are also available. For example, in an alternative embodiment, the top clipping plane 78 is defined at a position along z-axis at which the size of the marker that is parallel to the top clipping plane 78 and bottom plane 80 in the captured image equals a pre-defined size. In another alternative embodiment, the reference point is defined at a known position along the z-axis at which the size of a marker seen by the camera 54 equals a predefined size. In this embodiment, the bottom plane 80 may be higher or lower than the reference point, depending on the interactive input system configuration.

Figure 1C:
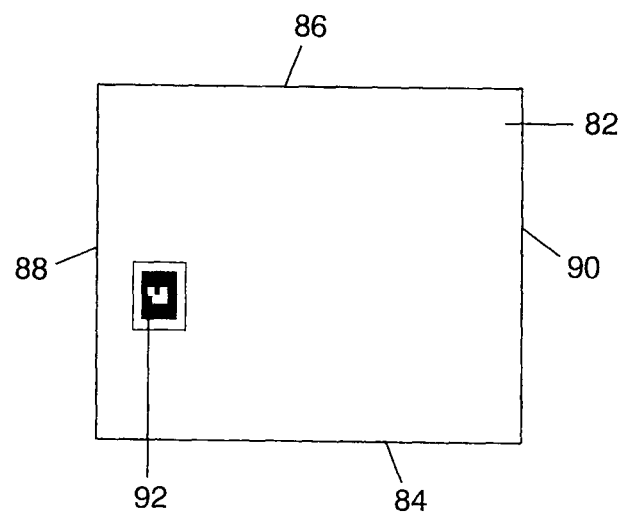
FIG. 1C is an image of the 3D input space captured by the 3D input device of FIG. 1B.

FIG. 1C shows an exemplary image 82 of the 3D input space 60 captured by the camera 54. The borders 84 to 90 of the image 82 correspond to the clipping planes 70 to 76, respectively. During processing of the image 82, the computing device 28 detects the coordinates of the marker 92 in the image 82, and converts the coordinates to x-y coordinates of the 3D input space 60. For example, if the marker 92 is near the border 88 in the image 82, it is then determined that the marker 92 is proximate to the clipping plane 74. As described above, the marker's coordinate along the z-axis is calculated by comparing the size of the pattern on the marker 92 in the image 82 with the size of the corresponding pattern reference image in the library.

In this embodiment, the computing device 28 runs a host software application such as SMART Notebook™ offered by SMART Technologies ULC. As is known, during execution, the SMART Notebook™ application provides a graphical user interface comprising a canvas page or palette, that is output to the projector 38 and presented on the interactive surface 24, and on which freeform or handwritten ink objects together with other computer generated objects can be input and manipulated via pointer interaction with the interactive surface 24.

Figure 2A:
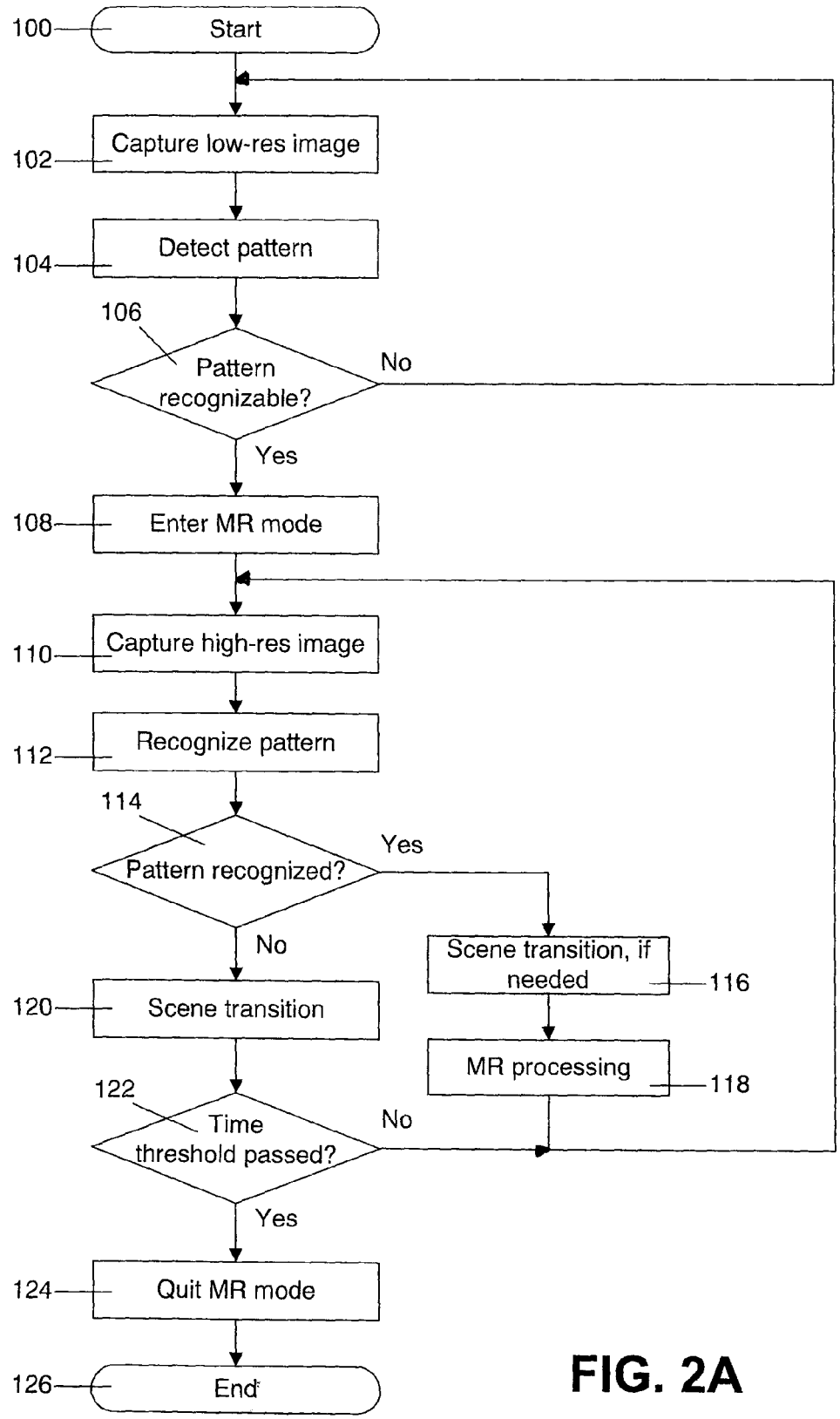
FIG. 2A is a flowchart showing steps performed during manipulation of digital content during tracking of physical objects positioned in the 3D input space.

The SMART Notebook™ application provides a mixed reality mode in a page of a SMART Notebook™ file to facilitate the display digital tools and content, and allow users to manipulate them by using one or more markers brought into the 3D input space 60. The computing device 28 automatically turns on the MR mode when a marker is detected in the 3D input space 60, and turns off the MR mode when no marker is detected in the 3D input space. When the MR mode is turned on, the computing device 28 continuously tracks markers 62 in the 3D input space 60 to control the manipulation of digital content. FIG. 2A illustrates the process of manipulating digital content objects by tracking markers in the 3D input space 60.

After the interactive input system 20 starts and the camera 54 is switched on (step 100), the camera is set to a low-resolution mode with a relatively slow frame rate so that the camera 54 captures a low-resolution image of the 3D input space 60 at regular intervals such as for example every three (3) seconds. When an image is captured, it is pre-processed and converted to a digital image by the control circuitry in the base 58 (step 102). The digital image is then conveyed to the computing device 28 and the image is processed to detect whether a recognizable pattern is present in the image (step 104).

If no recognizable pattern in the image is detected (the "No" branch of step 106), the process reverts to step 102 and the next low resolution image is captured by the camera 54. If it is determined that at least one pattern can be recognized (the "Yes" branch of step 106), the computing device 28 turns on the MR mode (step 108). At this step, the computing device 28 first checks to determine whether the SMART Notebook™ application program is running. If yes, the computing device 28 turns on the MR mode in the current SMART Notebook™ page; otherwise, the computing device 28 launches the SMART Notebook™ application program, and turns on the MR mode in a new SMART Notebook™ page.

When the MR mode is turned on, a transparent MR window is overlaid on the SMART Notebook™ page presented on the interactive surface 24, and the image captured by the camera 54 is displayed in the MR window. The 3D input space 60 is thus mapped to the MR window such that a marker positioned in the 3D input space is mapped to digital content and displayed at a corresponding location on the interactive surface 24 with a size scale representative of the marker's z-axis location within the 3D input space 60. The MR window may be an independent window that overlies the SMART Notebook™ window and or may be an MR layer within SMART Notebook™ that overlies the SMART Notebook™ page, depending on system design. Graphic objects on the SMART Notebook™ page are then brought into the MR window to allow users to manipulate the graphic objects using markers positioned within the 3D input space 60. Thereafter, the camera 54 is conditioned to a high-resolution mode and triggered so that the camera 54 captures a high-resolution image of the 3D input space 60 (step 110). The captured high-resolution image is pre-processed and converted to a digital image by the control circuitry in the base 58. The digital image is then conveyed to the computing device 28 and the image is processed to detect whether a recognizable pattern is present in the image, and, if so, to recognize the pattern (step 112).

If no pattern in the image is detected (the "No" branch of step 114), the computing device 28 applies a transition effect (e.g., a fade-out effect) to the scene in the MR window (step 120). The computing device 28 also starts a timer if not already started. At step 122, the computing device 28 checks the timer to determine if a threshold period of time has elapsed. If not, the process reverts to step 110 and another high-resolution image of the 3D input space 60 is captured. If the threshold time period has elapsed, the computing device 28 then moves the digital content objects in the MR window to the current SMART Notebook™ page and terminates the MR mode (step 124). The process then ends (step 126).

If, at step 112, at least one pattern is recognized (the "Yes" branch of step 114), the computing device 28 checks the timer to determine if it has been initiated. If so, the computing device 28 stops the timer and applies another transition effect (e.g., a fade-in effect) to the scene in the MR window (step 116).

Then, the computing device 28 processes the scene in the MR window, and modifies the high-resolution image captured by the camera 54 before displaying it on the interactive surface 24 (step 118). At this step, the computing device 28 compares the recognized pattern obtained from the captured image with the corresponding pattern reference image in the library to calculate the z coordinate of the marker in the 3D input space 60 and the rotation and tilting angles of the recognized pattern as described above. The x-y coordinates of the recognized pattern are directly calculated from the captured image. Historical data of the recognized pattern is also used to determine other parameters of the marker, such as for example, its velocity and acceleration of moving, rotating and tilting. The calculated parameters are then used to determine the interaction of the digital content in the image, which will be described herein. The image is then modified and displayed on the interactive surface 24. The process then reverts to step 110 and another high-resolution image of the 3D input space 60 is captured by the camera 54.

Figure 2B:
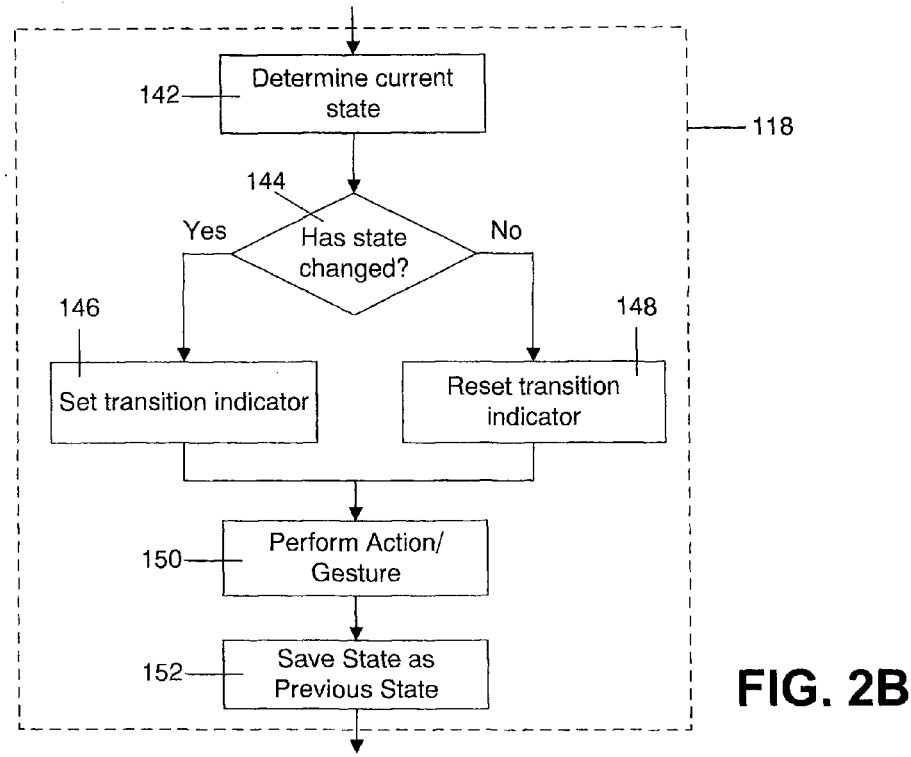
FIG. 2B is a flowchart showing steps performed during mixed reality processing.

FIG. 2B shows the steps performed during MR processing at step 118. At step 142, the computing device 28 determines the state of the marker and whether the state has changed from a previous state (step 144). If the state of the marker has changed from a previous state, the computing device 28 sets a transition indicator associated with the marker to a value based on the type of state transition (step 146), and the process proceeds to step 150. If at step 144 it is determined that the state of the marker has not changed, the transition indicator is reset to "No transition", and the process proceeds to step 150.

At step 150, the computing device 28 determines the action or gesture of the marker based on the marker's type, state transition, value of the transition indicator and the parameters calculated above, and modifies the image presented on the interactive surface 24 so that the digital content is manipulated accordingly. For example, the movement of a content marker within the 3D input space 60 (i.e., a marker comprising a pattern representing digital content) causes the corresponding digital content to move accordingly. The rotation of a tool marker within the 3D input space 60 (i.e., a marker comprising a pattern representing a digital tool) may cause panning of the image presented on the interactive surface 24.

At step 152, the current state and the calculated parameters are saved as the marker's previous information and the process reverts to step 110.

Figure 2C:
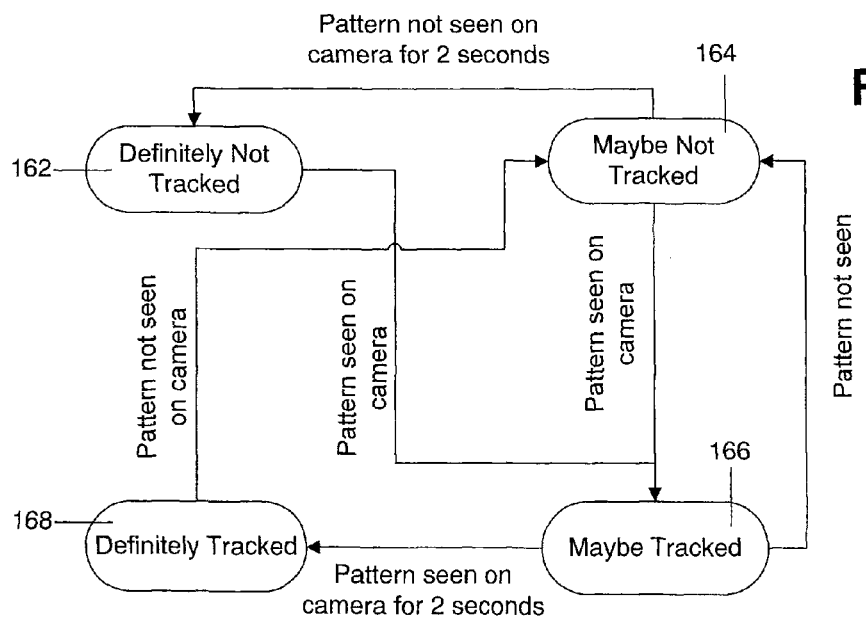
FIG. 2C shows the possible states of a physical object positioned in the 3D input space and transitions of the possible states.

FIG. 2C shows the states and their transitions. In some embodiments, each marker transitions between four states, i.e., "Definitely not tracked" 162, "Maybe not tracked" 164, "Maybe tracked" 166 and "Definitely tracked" 168. The state transition starts from the state "Definitely not tracked" 162, signifying that the computing device 28 cannot recognize the marker. In this case, digital content associated with the marker that was previously presented on the interactive surface 24 is to be deleted. If the computing device 28 cannot recognize the marker, the marker stays in this state, and the transition indicator is reset to "No transition". However, if the computing device 28 recognizes the pattern of the marker, the marker then transitions to the state "Maybe tracked" 166, signifying that the computing device 28 has recognized the marker and starts to track it. In this case, in some embodiments, the transition indicator is set to "Fade-in". Thus, when the computing device 28 performs actions or gestures (step 150 in FIG. 2B), the digital content associated with the marker will gradually appear in the image presented on the interactive surface 24 with a fade-in effect.

In the state "Maybe tracked" 166, if the pattern has been recognized for more than two (2) seconds, or another suitable threshold period of time, the marker then transitions to the state "Definitely tracked" 168, signifying that the computing device 28 is affirmatively tracking the marker. The transition indicator is set to "Fade-in". If the computing device 28 loses tracking of the marker when the marker is in the state "Maybe tracked" 166, the marker then transitions to the state "Maybe not tracked" 164, signifying that the computing device 28 is losing track of the marker. The transition indicator is set to "Fade-out". Thus, when the computing device 28 performs actions or gestures (step 150 in FIG. 2B), the digital content associated with the marker will gradually disappear in the image presented on the interactive surface 24 with a fade-out effect.

In the state "Definitely tracked" 168, the marker stays in this state if the pattern is recognized, and the transition indicator is reset to "No transition". However, if the pattern cannot be recognized, the marker then transitions to the state "Maybe not tracked" 164. The transition indicator is set to "Fade-out".

In the state "Maybe not tracked" 164, if the marker has not be recognized for more than two (2) seconds, or another suitable threshold period of time, the marker then transitions to the state "Definitely not tracked" 162, and the transition indicator is set to "Fade-out". However, if the marker is recognized when it is in the state "Maybe not tracked" 164, the marker then transitions to the state "Maybe tracked" 166, and the transition indicator is set to "Fade-in".

In this configuration, the digital content associated with the marker gradually appears when the marker is recognized by the computing device 28 and the digital content needs to be inserted into the image projected onto the interactive surface 24. The digital content gradually disappears when the pattern cannot be recognized by the computing device 28 and the digital content needs to be deleted from the image projected onto the interactive surface 24. Thus, users do not experience abrupt disappearing and appearing of digital content when the marker is brought out of or into the 3D input space 60 nor do users experience unwanted image flickering during temporary loss of marker tracking.

Figure 3A:
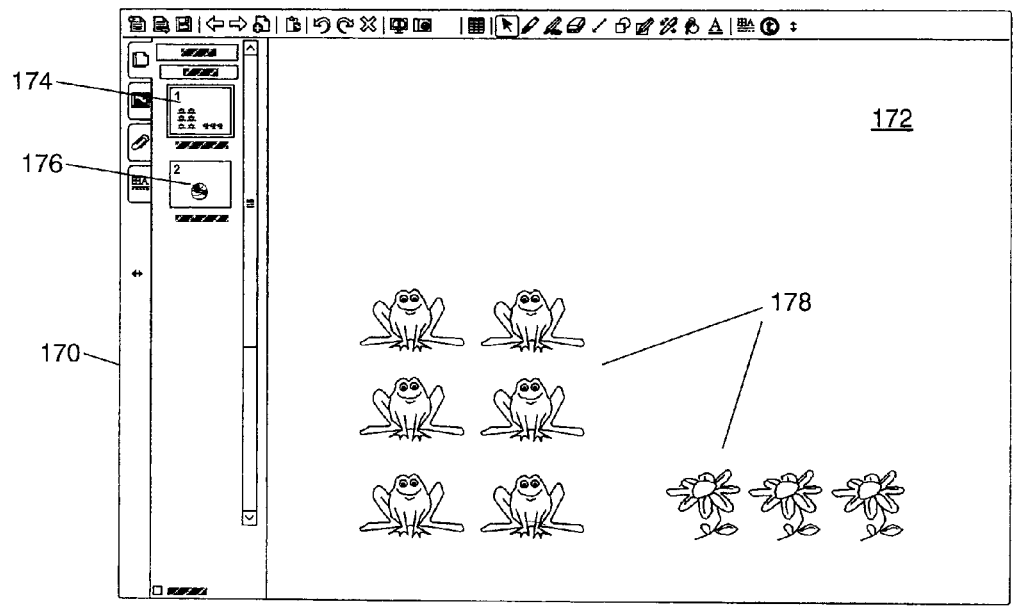
FIGS. 3A and 3B illustrate an example of an application program window transitioning from a non-mixed reality mode to a mixed-reality mode.
Figure 3B:
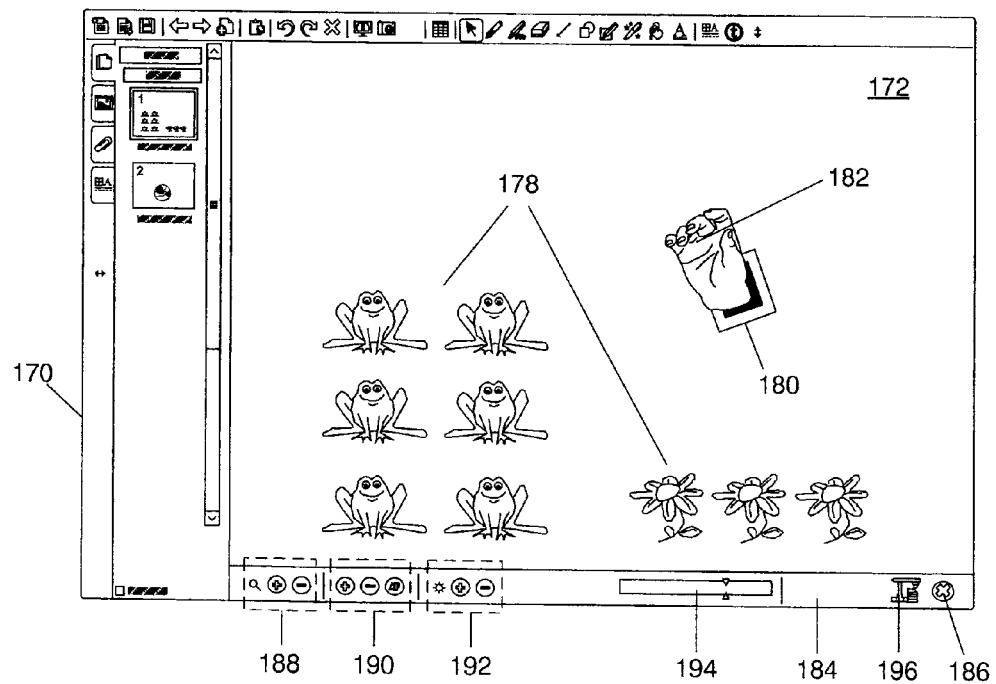

FIGS. 3A and 3B illustrate an example of a SMART Notebook™ page transitioning from the non-mixed reality mode to the MR mode. FIG. 3A shows SMART Notebook™ program window 170 that comprises two pages indicated by two page thumbnails 174 and 176, respectively. Page thumbnail 174 is associated with page 172 currently displayed in the SMART Notebook™ program window 170. Here and in the following examples, the page thumbnail associated with the current page that is displayed in the program window 170 comprises a thick border. Various pieces of digital content in the form of digital graphic objects 178 (in this example, frogs and flowers) are displayed in the SMART Notebook™ page 172.

In FIG. 3A, the MR mode is turned off. The camera 54, as described above, captures low-resolution images of the 3D input space 60 at regular intervals, which are processed by the computing device 28. As shown in FIG. 3B, when a marker 180 is brought into the 3D input space 60, and the pattern carried by the marker is recognized by the computing device 28 during processing of an image captured by camera 54, the MR mode is then turned on. A transparent MR window (not shown) is then overlaid on the SMART Notebook™ page 172 and the digital objects 178 are brought into the MR window. In this example, the marker 180 is assumed not initially to be associated with any digital content object. Thus, the computing device 28 associates a 3D cursor 182 to the marker, and the 3D cursor 182 appears in the SMART Notebook™ program window 170 with a transition effect, e.g., fade-in, proximate to the image of the marker 180. Those skilled in the art will appreciate that if a marker having an associated digital content object is brought into the 3D input space 60, and is recognized by the computing device 28 during processing of an image, the associated digital content object will be shown in the SMART Notebook™ program window 170.

In addition to the appearance of the 3D cursor 182, a toolbar 184 also appears in the MR window. The toolbar 184 comprises various function tools for controlling the MR environment. For example, a close button 186 may be used to turn off the MR mode. Zoom buttons 188 may be used to control the zooming of the camera 54. Focus buttons 190 may be used to manually or automatically adjust the focusing of the camera 54. Brightness buttons 192 may be used to adjust the brightness or darkness of images captured by the camera 54. An adjustable contrast bar 194 may be used to control the luminance of the camera 54. In some embodiments, the user may also interact with control buttons on the base 58 to execute the same functions in the toolbar 184. The camera icon 196 provides a visual indication signifying that the SMART Notebook™ page 172 is currently in the MR mode. Although not shown, when all markers are removed from the 3D input space 60, the MR mode is turned off.

FIGS. 4A to 4D illustrate the transition effect applied to a digital content object associated with a marker. In FIG. 4A, a marker is brought into the 3D input space 60, and its image 200 is captured by the camera 54 and displayed on the interactive surface 24. During processing of the image captured by the camera 54 by the computing device 28, the pattern on the marker is recognized. The digital content object 202 associated with the marker then gradually appears on the interactive surface 24 with a fade-in effect, until the digital content object 202 is fully displayed on the interactive surface 24, as shown in FIG. 4B.

In FIG. 4C, the marker 200 is flipped over to obscure the pattern from view by the camera 54. As a result, during processing of images captured by the camera 54, the computing device 28 is unable to recognize the pattern. Therefore, the digital content object 202 starts to fade-out until it completely disappears from the interactive surface 24, as shown in FIG. 4D.

In some alternative embodiments, a smooth-moving method may also be used when tracking of the marker is temporarily lost. Referring again to FIG. 2C, when the marker transitions to the state "Maybe not tracked" 164, the previous information, including the last position of the marker and the last position of the digital content object on the interactive surface 24, is stored in the memory of the computing device 28. Then if the marker transitions from the state "Maybe not tracked" 164 to the state "Maybe tracked" 166, the marker's position stored by the computing device 28 is compared with the marker's current position. If they are different, the computing device 28 generates a path from the stored position of the digital content object to the digital content object's current position by using, e.g., linear interpolation, and then moves the digital content object associated with the marker along the path from the stored position to the current position with the fading effect applied as described above.

FIGS. 5A to 5D illustrate the effect of smoothing. In FIG. 5A, the computing device 28 has recognized the marker 200 in an image captured by the camera 54 and displays the digital content object 202 associated with the marker on the interactive surface 24. As shown in FIG. 5B, the marker 200 is tilted to a sharp angle such that the computing device 28 cannot recognize its pattern in the captured image. The digital content object 202 as a result is then faded-out of the image presented on the interactive surface 24. Shown in FIG. 5C, before the digital content object completely fades out, the marker 200 is moved to another position. In this other position, the pattern on the marker 200 appears in images captured by the camera 54 and is recognized by the computing device 28. The computing device 28 then computes a path 204 from the digital content object's previous position 202A to its current position 202B, and moves the digital content object 202 along the path 204 from the previous position 202A to the current position 202B. Then, as shown in FIG. 5D, the digital content object 202 fades in to its full view in the image presented on the interactive surface 24.

Figure 6A:
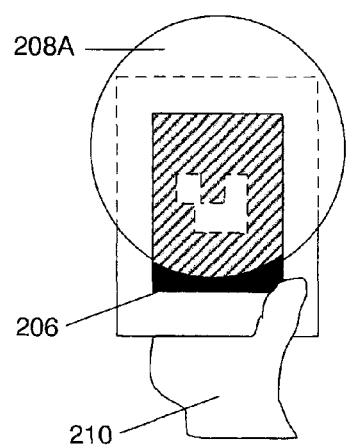
FIGS. 6A to 6C illustrate manipulation of a physical object positioned in the 3D input space to execute a shaking gesture.
Figure 6B:
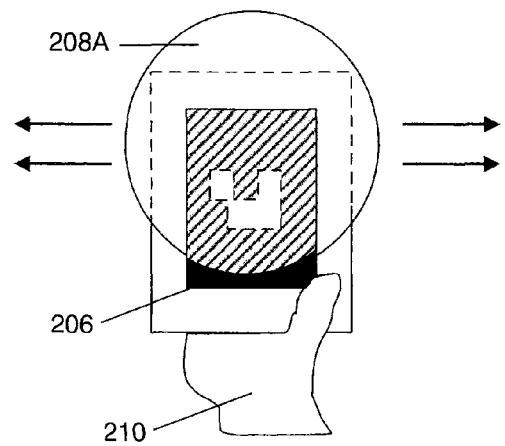
Figure 6C:
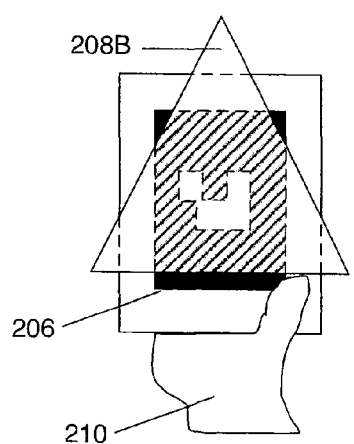

According to some aspects, the computing device 28 recognizes various gestures and applies the gestures in performing actions (step 150 in FIG. 2B). For example, FIGS. 6A to 6C illustrate a shaking gesture. In this embodiment, a marker 206 is associated with multiple digital content objects. In FIG. 6A, the marker 206 is initially associated with digital content object 208A, e.g., a ball and the marker and ball are presented on the interactive surface 24. In FIG. 6B, the user 210 shakes the marker 206 at a high acceleration, in left and right directions within the 3D input space 60. If the computing device 28 during processing of images captured by the camera 54 detects that the marker's movement is within a distance threshold with an acceleration higher than a threshold, and the movement has lasted for a period longer than a time threshold, that is, the following condition is satisfied:

> High acceleration for a period of time AND (Distance between the positions at the start and end of shaking<Threshold), then, as shown in FIG. 6C, the computing device 28 interprets the marker movement as a shaking gesture rather than simply back and forth movement of the marker 206 within the 3D input space 60. Upon recognition of the shaking gesture, the digital content object to which the marker 206 is associated with is changed to digital content object 208B, e.g., a triangle and the marker and triangle are presented on the interactive surface 24.

During the detection of the shaking gesture, the computing device 28 may experience temporary loss of tracking of the marker 206 as it is moved. In this case, the previous information stored in the computing device 28 is used to facilitate the gesture detection.

FIGS. 7A to 7D illustrate a covering gesture. In FIG. 7A, a marker 214 has been stationary in the 3D input space 60. Digital content object 212 associated with the marker 214 together with the marker 214 are shown on the interactive surface 24. In FIG. 7B, while the marker 214 remains stationary, the pattern on the marker is covered by the user 216. As a result, the tracking of the marker 214 is lost and the digital content object 212 starts to fade out of the image presented on the interactive surface 24. The computing device 28 detects that the velocity of the marker is slower than a slow speed threshold. After the tracking of the marker has been lost for a threshold period of time, the covering gesture is detected by the computing device 28. More precisely, the covering gesture is detected if the following condition is satisfied:

> (Last state is "Definitely tracked") AND (velocity in last state<threshold) AND last position is not near any clipping planes AND (current state is "May be not tracked").

The digital content object 212 is then faded-in to the image presented on the interactive surface 24, and is disassociated with the marker 214, as shown in FIG. 7C. As a result, the digital content object 212 stays in the image presented on the interactive surface 24 even after the marker is removed from the 3D input space 60, as shown in FIG. 7D. The user may bring the marker 214 back into the 3D input space. After the marker 214 is detected, the digital content object 212 is re-associated with the marker so that the user may manipulate the digital content object 212 by moving the marker 214 within the 3D input space 60.

The process of disassociating the 3D content with the marker after detection of the covering gesture may be summarized by the following pseudo code (where Ln represents the n-th line):

L1: If cover gesture detected
   L2: Start disassociation timer if it has not already started (note: 2 seconds deselection is required)
   L3: If time elapsed<2 seconds
      L4: Render arc centered around ContentPosition2D with angle (1−(time elapsed)/(2 seconds))*2Pi
   L5: Else
      L6: Disassociate content with the marker and apply animated transition to position it back on the Notebook™ page
   L7: End If
L8: End If Those skilled in the art will appreciate that instead of using two (2) seconds as the threshold time period, in some alternative embodiments, a different threshold time period may be used.

FIGS. 8A to 8C illustrate a stacking gesture. Shown in FIG. 8A, a first marker 224 that is associated with a first digital content object 226 is placed in the 3D input space 60. A second marker 220 that is associated with a second digital content object 222 is then placed in the 3D input space 60 and is stacked onto the first marker 224. The computing device 28 detects the stacking gesture by determining that the marker 220 substantially covers the marker 224 in the captured image, signifying that the marker 220 is stacked on top of the marker 224. As a result, the pattern on the first marker 224 cannot be recognized by the computing device 28 and the digital content object 226 starts to fade out of the image presented on the interactive surface 24. After a predefined period of time, as shown in FIG. 8B, the digital content objects 222 and 226 are merged to form a new digital content object 228. The digital content objects 222 and 226 are then faded out of the image presented on the interactive surface 24 and the new digital content object 228 is faded into the image presented on the interactive surface 24. In some embodiments, the new digital content object 228 is simply the union of the digital content objects 222 and 226. In other embodiments, the new digital content object 228 may be formed from digital content objects 222 and 226 according to a predefined rule. For example, hydrogen molecules may be stacked on an oxygen molecule to form a water molecule. As another example, horse and jockey objects may be merged so that, in the new digital content object 228, the jockey is on top of the horse. In some embodiments, each marker 220 and 224 is associated with a respective new digital content object 228. Therefore, as shown in FIG. 8C, when the user moves the markers 220 and 224 apart, movement of each marker will result in manipulation of the respective one of digital content objects 228A and 228B on the interactive surface 24. More precisely, the stacking gesture is detected if the following condition is satisfied:

> (Last state of the first marker is "Definitely tracked") AND (the current state of the first marker is "Maybe not tracked")&&(the current state of the second marker is "Maybe tracked") AND (the current distance between the first and second markers<threshold), where it is assumed that the first marker is occluded by the second marker.

The stacking gesture may be used as a means of cloning digital content objects. For example, FIG. 9A shows a marker 220 having associated digital content object 222 placed in the 3D input space 60, and a marker 230 having no associated digital content placed in the 3D input space and stacked on the marker 220. As marker 230 is stacked over top of marker 220, as shown in FIG. 9B, the digital content object 222 associated with marker 220 starts to fade out of the image presented on the interactive surface 24 as the pattern on the marker 220 is obscured by marker 230 and cannot be recognized in images captured by the camera 54. After a predetermined period of time, the stacking gesture is determined, and a copy of the digital content object 222 is cloned and associated to the marker 230. Although there is only one digital content object 222 shown on the interactive surface 24, the digital content object 222 fades in to its full view to indicate that it has been cloned. When the markers 220 and 230 are moved away from each other, each marker controls a respective one of digital content objects 222A and 222B in the image presented on the interactive surface 24.

Figure 10A:
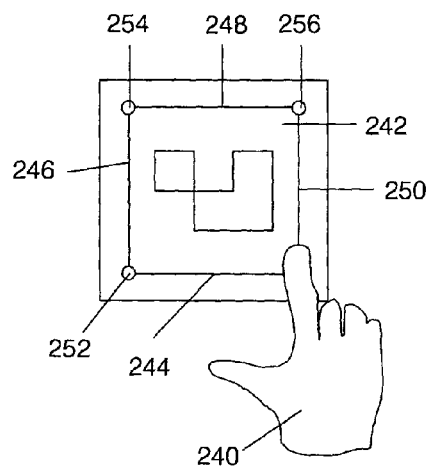
FIGS. 10A and 10B illustrate manipulation of a physical object positioned in the 3D input space to execute an occluding gesture.
Figure 10B:
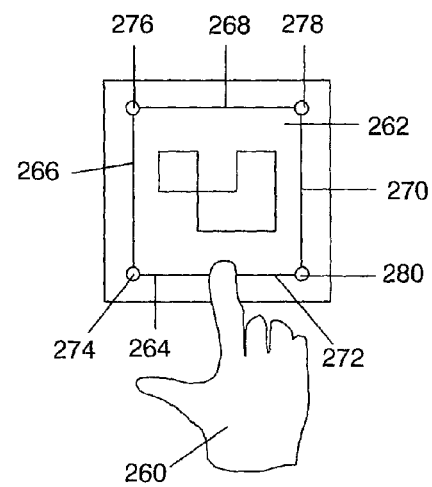

FIGS. 10A and 10B illustrate the gesture of occluding a corner of a marker, which is used when an occlusion detection mode is turned on. The computing device 28 uses edge detection based marker tracking algorithms known in the art to detect the lines associated with a given quad. The occluding a corner gesture is then detected based on the detected lines. FIG. 10A shows the user 240 covering a corner of the marker 242. The edge detection algorithm detects the boundary and corner points of the marker 242, which in this example are the lines 244 to 250 and the corner points 252 to 256. Each of the lines 246 and 248 is connected with two corner points, and each of the lines 244 and 250 is connected with only one corner point. Since the computing device 28 knows that the boundary of the marker must contain four lines and four corner points, it determines that a corner point is occluded. Therefore, the occluded corner point is calculated as the intersection of the lines 244 and

250. The gesture of occluding a corner is determined if the following condition is satisfied:

> Occlusion detection mode is enabled AND last state is "Definitely tracked" AND last state has no occlusion AND current state is "Definitely tracked" AND current state has occlusion on corner.

A command may be identified and then executed based on the corner that has been occluded.

In FIG. 10B, the user 260 is covering the middle of a border of marker 262. In the case, the computing device 28 will detect lines 264 to 272 and endpoints 274 to 280. The computing device 28 thus identifies the border as being occluded. The gesture of occluding the middle of a border is determined if the following condition is satisfied:

> Occlusion detection mode is enabled AND last state is "Definitely tracked" AND last state has no occlusion AND current state is "Definitely tracked" AND current state has occlusion on middle of marker border.

A command may be executed accordingly.

Figure 10C:
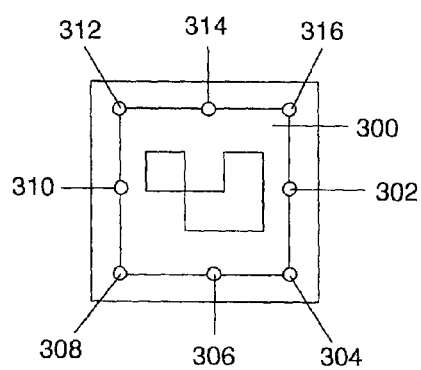
FIG. 10C shows zones of the physical object that may be used for the occluding gesture.
Figure 10D:
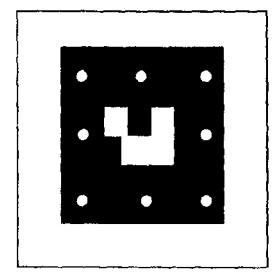
FIG. 10D shows a physical object having zones that may be used for the occluding gesture.

In this manner, the computing device 28 is able to detect eight (8) zones 302 to 316 around the border of a marker 300, as shown in FIG. 10C. Each zone may be assigned with a different task. For example, touching (i.e., occluding) the top right corner 316 may result in a context menu (not shown) of the associated digital content object being displayed on the interactive surface 24; touching the top center point 314 may allow the user to rotate the associated digital content object; touching the bottom right corner 304 may allow the user to resize the associated digital content object, etc. In some embodiments, visual clues of the touchable points may be printed on the marker, e.g., the white dots as shown in FIG. 10D.

Although the markers shown and described above are in the form of cards or cubes having a pattern on one surface thereof, those of skill in the art will appreciate that the cards or cubes may have patterns on multiple surfaces allowing the markers to be associated with multiple digital content objects, or a digital content object associated with one side and a digital tool associated with the other side. Of course, the markers need not be in the form of cards or cubes but may take other two-dimensional or three-dimensional shapes.

Figure 11A:
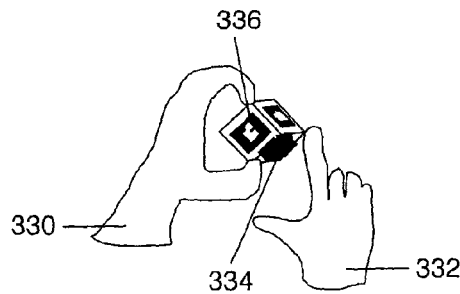
FIGS. 11A and 11B illustrate manipulation of a physical object positioned in the 3D input space to execute rotation gestures.
Figure 11B:
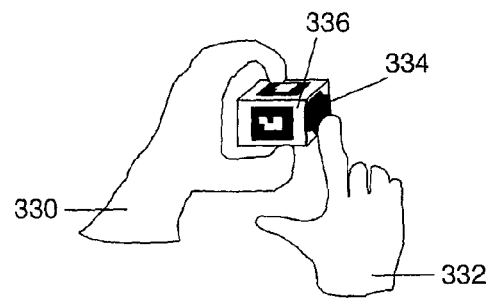

For example, FIGS. 11A and 11B illustrate two rotation gestures that may be input using 3D markers. FIG. 11A shows the left hand 330 of a user holding a cube-shaped marker 334 on two corners, with at least one surface 336 not occluded. The user is able to use the right hand 332 to rotate the cube 334. To detect this gesture, the computing device 28 first detects whether multiple patterns each having a tilted orientation corresponding to different sides of the cube 334 have been recognized. If such patterns have been detected and the cube 334 is detected as staying at relatively the same position while rotating, the computing device 28 detects the rotation gesture.

Figure 11C:
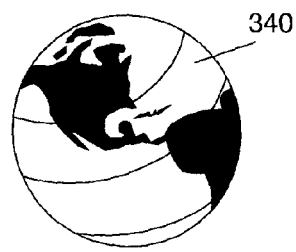
FIG. 11C shows digital content that may be used with the rotation gestures.

In FIG. 11B, the user uses a hand 330 to hold the cube-shaped marker 334 with a finger and thumb resting on the middle of the top and bottom surfaces of the marker, respectively, with at least one surface 336 not occluded. The user may use the other hand 332 to rotate the cube along the x-axis. To detect this gesture, the computing device 28 first detects a first pattern corresponding to one face of the cube 336. The detection of the first pattern is stored in the computing device 28 so that a short period of no markers being tracked would not affect the gesture detection. Then, the computing device 28 detects a second pattern corresponding to another face of the cube 334. If the cube 334 is detected as staying at relatively the same position, the computing device 28 detects the rotation. Depending on the order of the detected patterns, the computing device 28 determines whether the cube 334 is rotating to the left or right, and calculates the angular velocity of the cube 334. The gesture is determined if the angular velocity is higher than a threshold and the position of the cube is not significantly changed (e.g., position change is less than a small threshold). After the gesture is determined, the computing device 28 calculates the angular velocity and acceleration along the rotation direction, which are used to determine the action (e.g., rotation, scrolling or moving) applied to the associated digital content object. In this manner, the computing device 28 stabilizes the action applied to the digital content object, and prevents the digital content object from shaking and jittering in response to marker movement. Moreover, the rotation of associated digital content object triggered by these gestures is limited to rotation along one direction, and accidental tilting of the marker during rotation would not translate to tilting of the associated digital content object. These gestures are useful for rotating digital content objects such as a globe 340 as shown in FIG. 11C.

In some alternative embodiments, the rotation gestures may be interpreted as zooming in/out. For example, rotating the cube to the left may be interpreted as zooming in, and rotating the cube to the right may be interpreted as zooming out. In some other alternative embodiments, the computing device 28 further distinguishes the rotation direction and applies different actions to different rotation directions. For example, rotating a cube associated with a digital content object in the form of a globe along the x-axis of the 3D input space 60 may be interpreted as rotating the globe and rotating the cube along the y-axis may be interpreted as zooming in/out of the image of the globe.

Those skilled in the art will appreciate that other actions or commands may also be associated with the rotation gesture, such as for example horizontally or vertically scrolling, depending on the direction of rotation, along a list or menu to which the marker is associated.

Figure 12A:
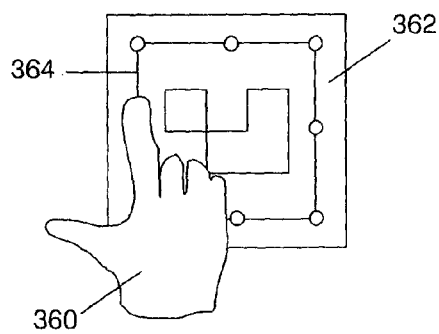
Figure 12B:
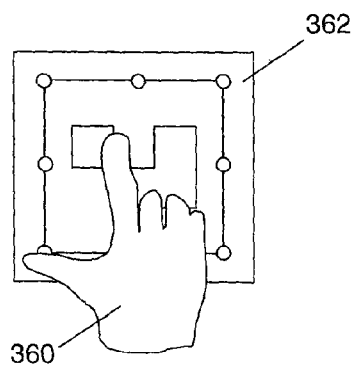
Figure 12C:
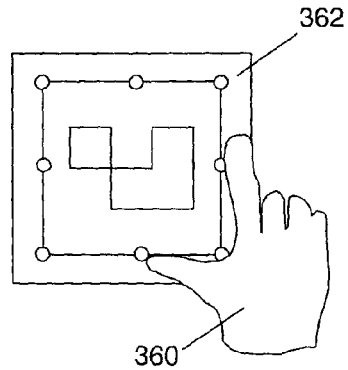

FIGS. 12A to 12C show a finger swipe gesture, which is carried out by swiping a finger 360 across the marker 362. The detection of this gesture comprises two phases. In the first phase, the computing device 28 determines whether the following condition is satisfied:

> Last state is "Definitely tracked" AND in last state a first border is occluded AND current state is "Maybe not tracked".

If this condition is satisfied, it is determined that, previously, the finger 360 occluded the border 364 of the marker 362, as shown in FIG. 12A (i.e., last state is "Definitely tracked" AND in last state a first border is occluded). Then, the finger moved over the marker 362 and occluded the pattern, as shown in FIG. 12B (i.e., current state is "Maybe not tracked").

If the first phase condition is satisfied, the computing device 28 then performs a second phase check to determine whether the following condition is satisfied:

> Last state is "Maybe not tracked" AND current state is "Maybe tracked" AND at current state a second border opposite to the first border is occluded.

If this condition is also satisfied, it is determined that previously, the finger 360 occluded the pattern of the marker 362, as shown in FIG. 12B (i.e., last state is "Maybe not tracked"). Then, the finger moved to the other side of the marker and occluded the second border opposite to the first border, as shown in FIG. 12C (i.e., current state is "Maybe tracked" AND at current state a second border opposite to the first border is occluded). The finger swipe gesture is determined when the second phase condition is also satisfied. A command or action may be executed after the detection of this gesture.

Those skilled in the art will appreciate that the finger-swipe gesture may be performed from left to right, from right to left, from top to bottom, or from bottom to top. The finger swipe gesture may be useful for toggling between different digital content objects associated to the same marker. For example, as shown in FIGS. 12D and 12E, a finger 380 swiping across a marker 382 having associated digital content object 384 in the form of a ball will toggle the digital content object associated with the marker 382 to a triangle 386.

In some embodiments, the clipping planes of the 3D input space 60 (i.e., the boundary planes 70 to 78 of the 3D input space 60; see FIG. 1B) are used to detect a clipping plane gesture, which is triggered when a marker is moved to the proximity of a clipping plane. The clipping plane gesture is determined if the following condition is satisfied:

(Current state is "Definitely tracked" AND position is near a clipping plane).

FIGS. 13A to 13C illustrate a clipping plane gesture. In FIG. 13A, an image 400 comprising a user 402, a marker 404 and the digital content object 406 associated with the marker 404 presented on the interactive surface 24 is shown. The user 402 is moving the marker 404 towards a clipping plane represented by the border 408 as indicated by the arrow. In FIG. 13B, the marker 404 is moved to the proximity of the border 408 and the above condition is satisfied. As a result, the digital content object 406 is faded out of the image presented on the interactive surface 24, as shown in FIG. 13C.

FIGS. 14A to 14D show a hovering gesture for associating digital content object to a marker. In FIG. 14A, digital content objects 422 to 426 are shown in the image presented on the interactive surface 24. The user 428 moves a marker 430 having no associated digital content object toward the digital content object 424. In FIG. 14B, the marker 430 is moved "under" the digital content object 424 (i.e., to a position overlapping the digital content object 424). Consequently, the digital content object 424 is enlarged and hovers above the marker 430. After the marker 430 stays under the digital content object 424 for a predefined period of time, as shown in FIG. 14C, the digital content object 424 is associated with the marker 430. A ring around the digital content object 424 is displayed to indicate the association, and the digital content object 424 is animated to its original size. As shown in FIG. 14D, the user 428 may move the digital content object 424 to a different location by moving the marker 430 within the 3D input space 60. In particular, the hovering gesture is detected if the following condition is satisfied:

((current state is "Definitely tracked") AND (3D cursor location overlaps the digital content object) AND (velocity<threshold)) for a period of time.

Those skilled in the art will appreciate that many other gestures are also available. For example, a tap/stamp gesture may be defined as quickly moving a marker up from and then back down to a z-location within the 3D input space 60. This gesture may be used to "stamp" digital content objects to a canvas page, or may be used to press a button.

A combo tap gesture may be defined as a series of successive tap/stamp gestures. This gesture may be used to navigate to previous or next canvas pages in a multiple-page application. The location the combo tap gesture may be used to determine the canvas page to be navigated to. For example, applying a combo tap gesture near the left clipping plane implies navigating to the previous canvas page, and applying a combo tap gesture near the right clipping plane implies navigating to the next canvas page. In some alternative embodiments, the number of taps in the combo tap gesture may also be used to determine which canvas page should be navigated to. A quick swipe gesture is similar to the finger swipe gesture but with a high speed faster than a threshold. This gesture may be used to strike out or erase digital content from the interactive surface 24. A checkmark gesture may be defined as moving a marker along a path similar to a checkmark. This gesture may be used to display a checkmark on the canvas page, and/or indicate another program running on the computing device 28 or another computing device connected to the computing device 28 that a question has been correctly answered.

In some embodiments, a virtual camera fly-through method may be used to allow the user move into a digital content object and see its interior. As shown in FIG. 15A, digital content object 440 remains alone in the image presented on the interactive surface 24 as a result of a covering gesture. In FIG. 15B, a special marker 442 representing a virtual camera is brought into the 3D input space 60. The marker 442 is shaped in such a way that it comprises a recognizable direction indicating the direction of a virtual camera view. The computing device 28 detects the marker 442 and displays an image 444 of the virtual camera on the interactive surface 24, which indicates the direction the virtual camera is viewing. At the same time, an animation is played to indicate that the virtual camera 444, and thus the user's view, is flying to a predefined position inside the digital content object 440, as shown in FIGS. 15B to 15D. After the flying-in animation, as shown in FIG. 15D, the interior of the digital content object 440 is displayed on the interactive surface 24. A preview window 446 showing the digital content object 440 and an indicator 448 identifying the virtual camera position and viewing direction within the digital content object 440 is also displayed. By moving the virtual camera marker 442 within the 3D input space 60, the user can freely move around and view perspectives within the digital content object 440. For example, in FIG. 15E, the user rotates the virtual camera marker 442 within the 3D input space 60 to bring the virtual camera 444 to a different location inside the digital content object 440. As a result, the view of the digital content object 440 is changed, and the preview window 446 is also properly updated.

Figure 16:
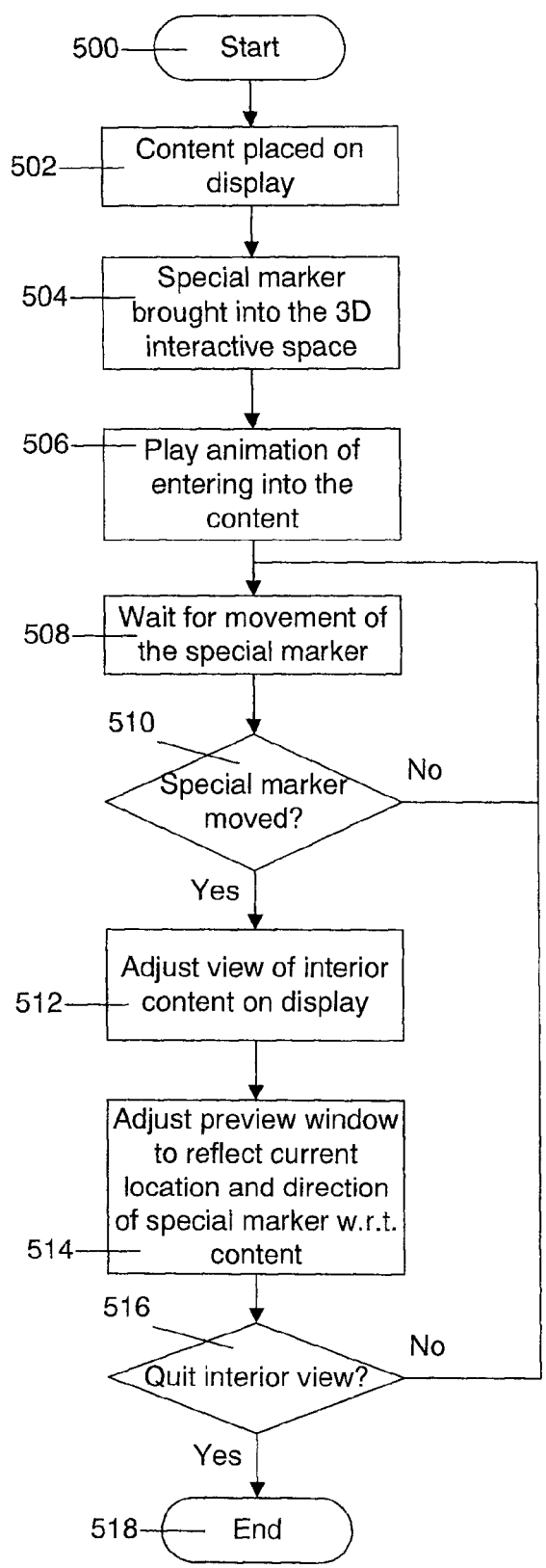
FIG. 16 is a flowchart showing the steps performed during the virtual camera fly-through method.

FIG. 16 is the flowchart of the virtual camera process. After the process starts (step 500), a digital content object comprising interior views is presented on the interactive surface 24 (step 502). Various methods may be used to bring the digital content object into the image presented on the interactive surface, for example, by using the covering gesture described previously. Alternatively, the user may select the digital content object from a library. At step 504, the special marker representing the virtual camera is brought into the 3D input surface. As previously described, the shape of the special marker comprises an indication of the direction of the virtual camera view. After the pattern on the special marker is recognized, an animation is played to indicate that the virtual camera is entering into the digital content object at a pre-defined location (step 506). At the end of this step, an interior view of the digital content object is presented on the interactive surface 24. At step 508, the computing device 28 waits for movement of the special marker within the 3D input space 60. At step 510, the computing device 28 determines if the special marker has been moved. If no movement of the special marker is detected, the process goes back to step 508. If movement of the special marker is detected at step 510, the display of the interior view of the digital content object is then adjusted accordingly to the location and the viewing direction of the special marker (step 512). The preview window is also updated to reflect the current location and viewing direction of the special marker relative to the digital content object (step 514). Therefore, the preview window provides visual feedback to the user regarding the location and the viewing direction of the virtual camera. The scale of the marker's movement with respect to the size of the digital content object also provides visual feedback to the user.

At step 516, the computing device 28 determines if it has received a quit interior view command by, e.g., moving the special marker out of the 3D input space. If a quit interior view command has been received, the process is terminated (step 518); otherwise, the process goes back to step 508 to detect further movement of the special marker within the 3D input space 60.

Figure 17A:
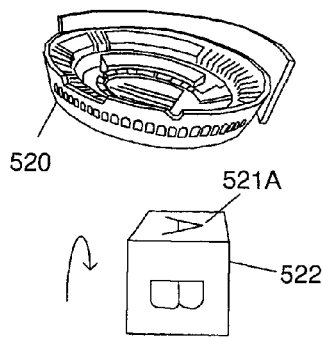
FIGS. 17A to 17C illustrate a content selection technique that selects digital content in response to rotation of a physical object positioned in the 3D input space.
Figure 17B:
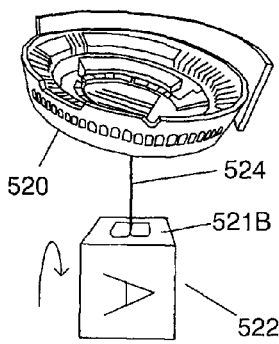
Figure 17C:
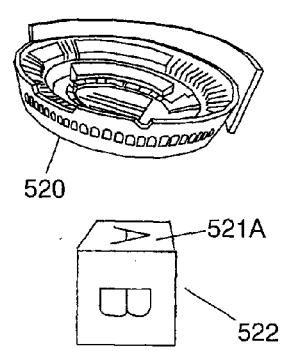

FIGS. 17A to 17C illustrate a rotation gesture for selecting 3D digital content. In this embodiment, as shown in FIG. 17A, a cube-shaped marker 522 is placed within the 3D input space 60 so that the marker appears within a defined proximity of the 3D content object 520 that the user wishes the marker to be associated with, with a first marker pattern shown on the top face 521A of the cube-shaped marker 522. It is assumed that cube-shaped marker 522 currently has no 3D digital content association. After the cube-shaped marker 522 has been rotated so that a different marker pattern is presented on the top face 521B of the cube-shaped marker, following recognition of that pattern, the computing device 28 associates the marker pattern on the top face 521B of the cube-shaped marker 522 with the 3D digital content object 520. A line segment 524 is introduced, connecting between the top face 521B of the cube-shaped marker and the 3D content object 520, indicating that the association has been made, as shown in FIG. 17B. The user is now free to manipulate the views of the 3D object content 520 through manipulation of the cube-shaped marker 522 within the 3D input space 60. In FIG. 17C, the user has rotated the cube-shaped marker 522 back to its original orientation, which results in the computing device 28 disassociating the 3D content object 520 from the cube-shaped marker 522.

Figure 18A:
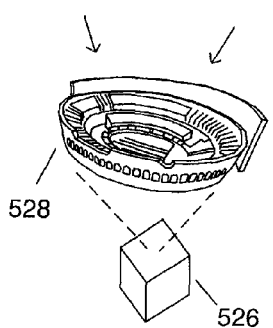
FIGS. 18A to 18D illustrate an alternative content selection technique that selects digital content by attracting digital content to a physical object positioned in the 3D input space.
Figure 18B:
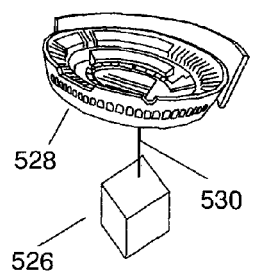
Figure 18C:
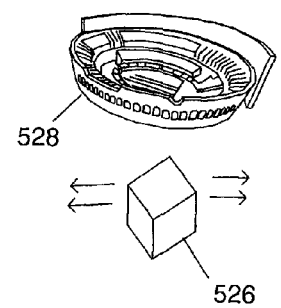
Figure 18D:
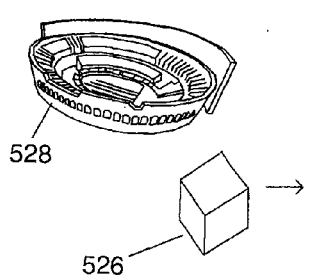

FIGS. 18A to 18D illustrate an attraction technique for 3D content selection. As shown in FIG. 18A, as the cube-shaped marker 526, which currently has no 3D content association, is moved within the 3D input space 60 so that its image approaches the defined proximity of the 3D content object 528 that the user wishes the cube-shaped marker 526 to be associated with, the computing device 28 following processing of images captured by the camera 54, animates the 3D content object 528 so that the 3D digital content object 528 appears to move towards the cube-shaped marker 526. This would appear to the user as if the 3D content object 528 is attracted to the cube-shaped marker 526. In FIG. 18B, a line segment 530 is shown connecting the cube-shaped marker 526 and the associated 3D content object 528, to signify visually to the user that the association has been made. In FIG. 18C, the cube-shaped marker 526 is moved back and forth within the 3D input space 60 at a high rate in a shaking motion. This movement of the cube-shaped marker 526 within the 3D input space 60 is recognized by the computing device 28 as an input gesture, resulting in the computing device 28 disassociating the 3D content object 528 from the cube-shaped marker 526. As a result, the line segment no longer connects the 3D content object 528 to the cube-shaped marker 526. In FIG. 18D, the 3D content object 528, which has been disassociated from the cube-shaped marker 526, is not manipulated when the cube-shaped marker 526 is moved within the 3D input space 60.

Figure 19A:
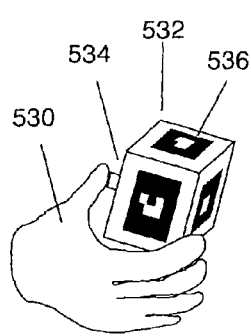
FIGS. 19A to 19C illustrate yet another content selection technique that selects digital content in response to a cube-shaped physical object comprising liquid crystal display (LCD) panels positioned in the 3D input space.
Figure 19B:
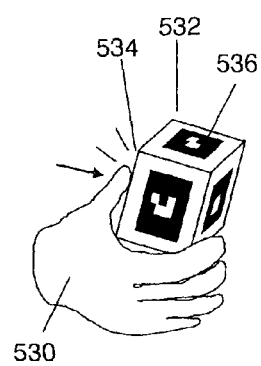
Figure 19C:
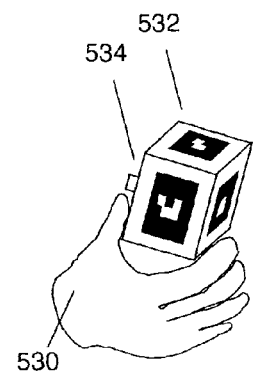

FIGS. 19A to 19C illustrate a 3D content selection technique that makes use of a marker employing liquid crystal display (LCD) panels. In FIG. 19A, the user 530 is holding a cube-shaped marker 532 within the 3D input space 60 so that its image appears within a defined proximity of a 3D content object (not shown) presented on the interactive surface with which user 530 wishes the marker to be associated. At least one outer surface of the cube-shaped marker 532 comprises an LCD panel 536 presenting a marker pattern. It is assumed that the marker pattern currently has no 3D content association. Upon pushing button 534, as shown in FIG. 19B, the marker pattern presented by the LCD panel 536 changes to a different marker pattern. With this change, following processing of an image captured by the camera 54, the computing device 28 associates the marker pattern on the top LCD panel 536 with the 3D content object. As shown in FIG. 19C, the button 534 has been released and the user 530 is able to manipulate the associated 3D content object by moving the cube-shaped marker 532 within the 3D input space 60.

Figure 20A:
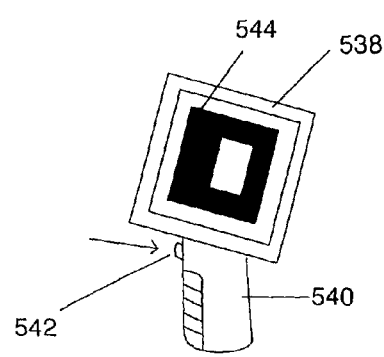
FIGS. 20A and 20B illustrate still yet another content selection technique that selects digital content in response to a physical object comprising an LCD panel and a handle positioned in the 3D input space.
Figure 20B:
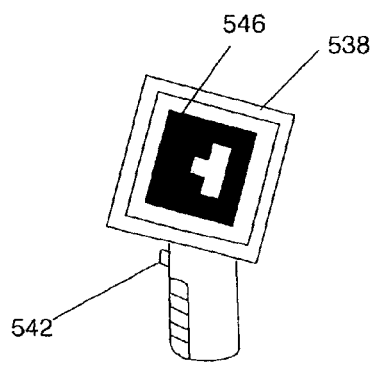

FIGS. 20A and 20B show another method of content selection using a marker employing an LCD panel. FIG. 20A shows a marker comprising an LCD panel 538 presenting a marker pattern 544. The LCD panel 538 is attached to a handle 540. A trigger button 542 is provided on the handle. It is assumed that the marker pattern 544 currently has no 3D content association. When the trigger button 542 is pushed, the marker pattern 544 presented by the LCD panel 538 changes to a new marker pattern 546, as shown in FIG. 20B. When this marker pattern 546 appears in the LCD panel 538 and the image of the LCD panel is within a defined proximity of a 3D content object (not shown) presented on the interactive surface 24, following processing of an image captured by the camera 54, the computing device 28 associates the marker pattern 538 with the 3D content object and the user is able to manipulate the views of the 3D content object through manipulation of the LCD panel 538 within the 3D input space 60. When the trigger button 542 is pushed again, the marker pattern 546 presented by the LCD panel 538 will change to another marker pattern resulting in the computing device 28 disassociating the 3D content from the LCD panel 538.

Figure 21A:
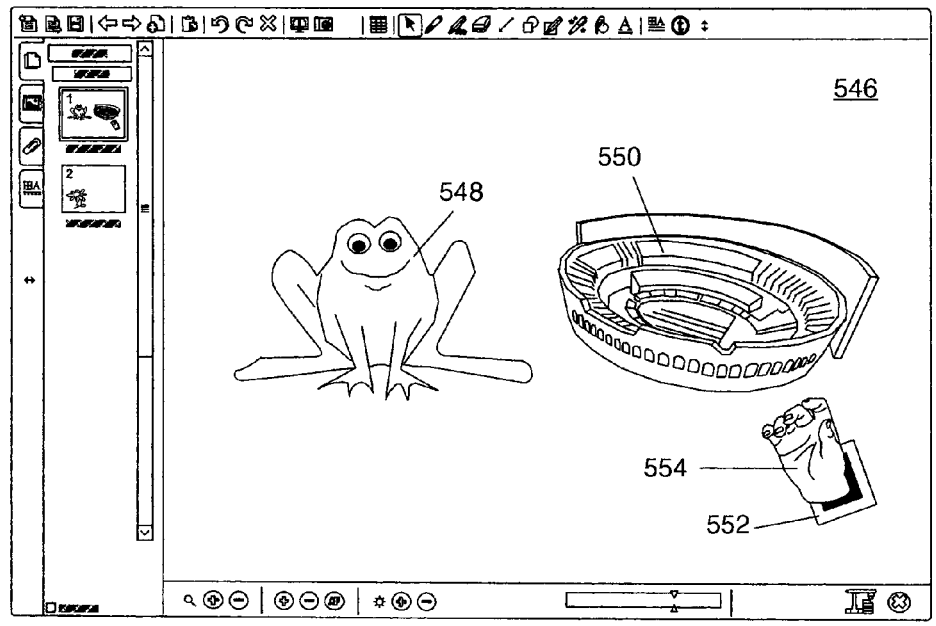
FIGS. 21A to 21C illustrate a dwelling gesture for selecting digital content in response to a physical object positioned in the 3D input space.
Figure 21B:
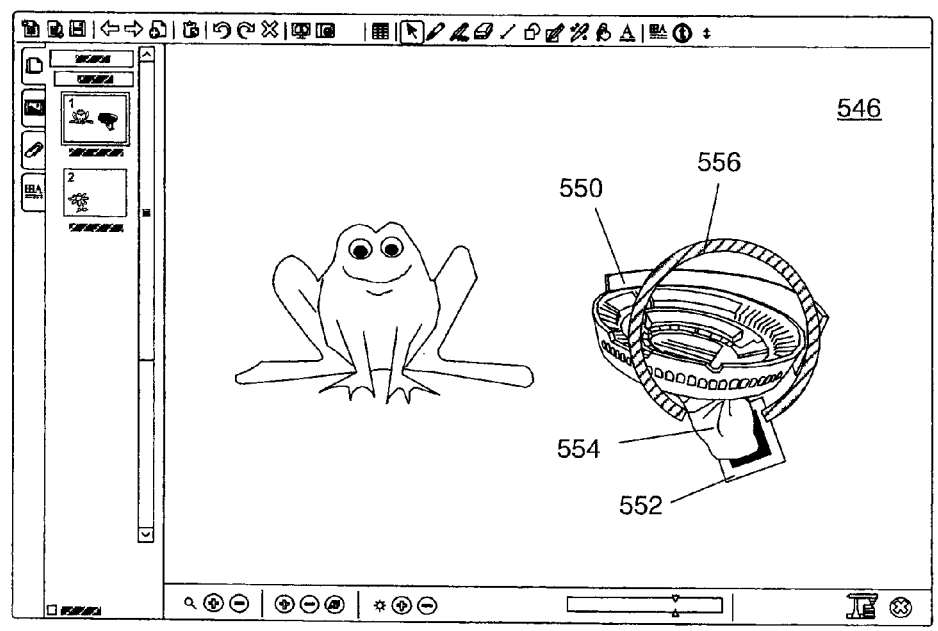
Figure 21C:
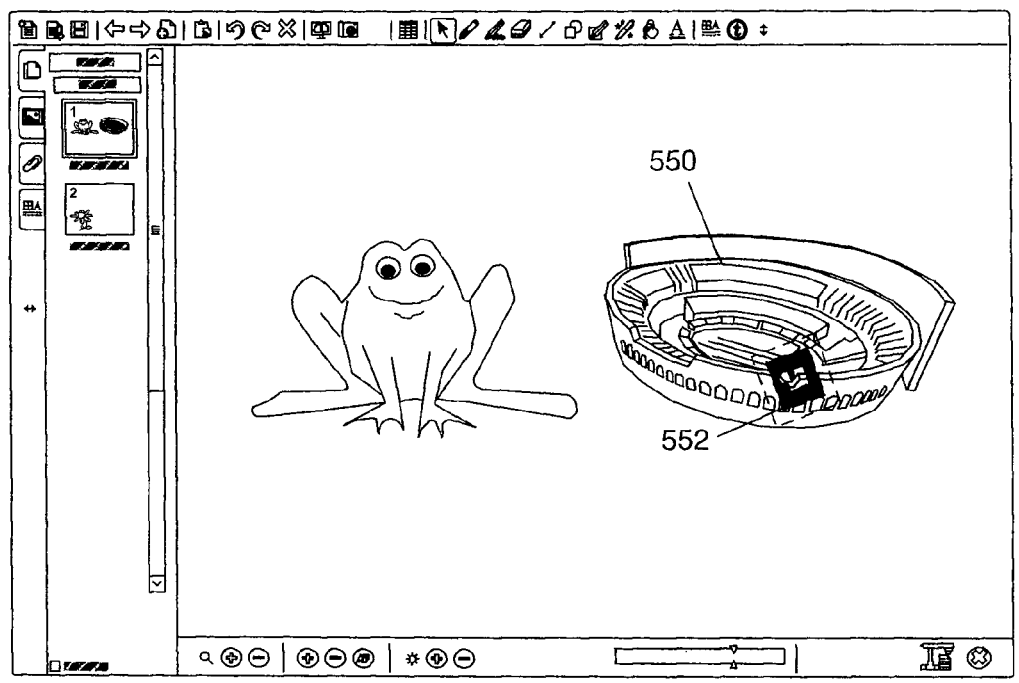

FIGS. 21A to 21C illustrate 3D content selection utilizing a dwelling technique. FIG. 21A shows a mixed reality canvas page 546 with selectable 3D content objects 548 and 550 presented thereon (in this example a frog and a stadium). A marker 552 that is assumed to have no associated 3D content is positioned within the 3D input space 60. As a result, following processing of images captured by the camera 54, the computing device 28 generates a 3D cursor 554 that appears proximate to the image of the marker within the canvas page 546. As shown in FIG. 21B, as the marker 552 is moved within the 3D input space 60 to position the 3D cursor 554 within the defined proximity of the 3D content object 550 with which the user wishes the marker to be associated, the computing device 28 animates the 3D content object 550 and visually scales the 3D content object 550 down in size to provide a feeling of attraction to the 3D cursor 554. The 3D content object 550 appears on top of the 3D cursor 554. A timer is started and a timing indication 556 is shown over the 3D content object 550. The user is required to maintain the marker 552 within the defined proximity of the 3D content object for at least the threshold time period (determined by the timer and indicated by the timing indication 556) in order to associate the 3D content object 550 to the marker 552. If the 3D cursor 554 is moved beyond the defined proximity before the threshold time period has elapsed, the 3D content object 550 will not become associated with the marker 552. However, as shown in FIG. 21C, if the threshold time period has elapsed while the marker 552 remains within the defined proximity of the 3D content object 550, then the computing device 28 associates the 3D content object 550 to the marker 552, and removes the 3D cursor 554 since the 3D content object has now been associated to the marker 552. The 3D content object 550 is then animated to its original size and the user may manipulate the views of the selected 3D content object 550 as desired by moving the marker 552 within the 3D input space 60.

The above process is summarized by the following pseudo code (where Ln represents the n-th line):
L1: CubePosition3D=3D position of the tracked marker that is not associated with digital content;
L2: CubePosition2D=Calculating projection of CubePosition3D onto the 2D Notebook™ page;
L3: For each digital content on the Notebook™ page,
    L4: ContentPosition2D=Calculating projection of the position of the 3D content object onto the 2D Notebook™ page;
    L5: Distance=distance between ContentPosition2D and CubePosition2D;
    L6: If Distance<50 mm
    L7: Scale 3D content object by Distance/50;
    L8: If Distance<20 mm
        L9: Start the dwell timer to select content if timer has not already started (note: 2 seconds dwell is required)
        L10: If time elapsed<2 seconds
            L11: Render arc centered around ContentPosition2D with angle (time elapsed)/(2 seconds)*2Pi
        L12: Else
            L13: Select content and apply animated transition to position it on top of the marker
        L14: End If
    L15: Else
        L16: Stop and reset dwell timer; reset the content to its original size;
    L17: End If
L18: End For In the above pseudo code, the distance between the 3D cursor and the 3D content object to determine if the 3D cursor is within the defined proximity of the 3D content is measured in millimetres. Those skilled in the art will appreciate that, in alternative embodiments, pixels or other suitable units may be used to measure the distance. Moreover, instead of using two seconds as the threshold time period, in some alternative embodiments, a different threshold time period may be used.

Figure 22A:
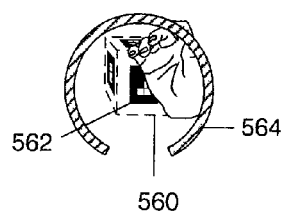
FIGS. 22A to 22C illustrate manipulation of a physical object positioned in the 3D input space to open a menu and select an item thereof.
Figure 22B:
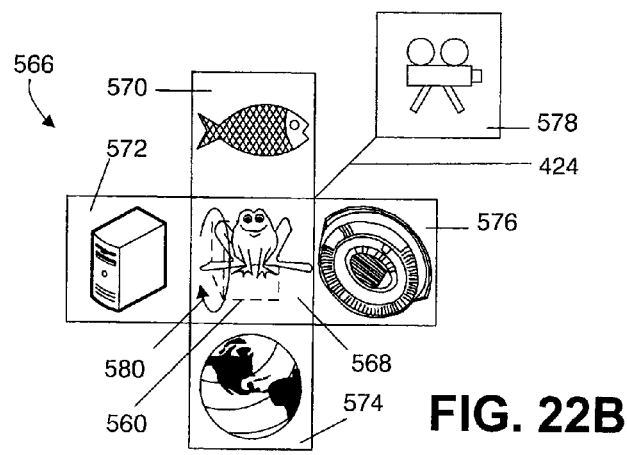

In some embodiments, a cube with each surface having a different pattern may be used to select from a set of predefined digital content. As shown in FIG. 22A, a selection tool in the form of a cube 560 with each surface of the cube having a different pattern thereon, is positioned within the 3D input space 60 and with the surface 562 facing the camera 54. The user is then assumed to perform a covering gesture (not shown) or another appropriate gesture to the cube 560 that is recognized by the computing device 28 through processing of images captured by the camera 54. In response, the computing device 28 displays an indicator 564 that starts to grow with a predefined speed to indicate the time that the covering gesture is maintained. When a threshold time period has passed (indicated by the indicator growing to a full circle), the computing device 28 presents a menu 566 comprising six (6) digital content objects 568 to 578 around the image of the cube 560 with an animation effect (e.g., fade-in) as shown in FIG. 22B. The menu 566 is arranged in such a way that the position of each digital content object indicates the surface of the cube 560 to which it may be associated. For example, the digital content object 568 overlaps with the image of the cube 560 indicating that it may be associated with the top surface 562. Digital content objects 570 to 576 are shown along the four sides of the image of the cube 560 indicating that they may be associated with the corresponding side surface of the cube 560. The digital content object 578 is shown with a line linking to the cube 560 indicating that it may be associated with the bottom surface of the cube 560.

Figure 22C:
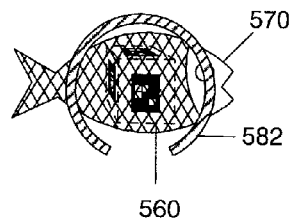

The user may rotate the cube 560 within the 3D input space 60 to present another surface to the camera 54 to select digital content. For example, if the user rotates the cube 560 by 90 degrees along the direction indicated by the arrow 580, the digital content object 570 is then selected. As illustrated in FIG. 22C, an indicator 582 is shown and starts to grow with a predefined speed. The selection is confirmed when the indicator 582 grows to a full circle.

Figure 23A:
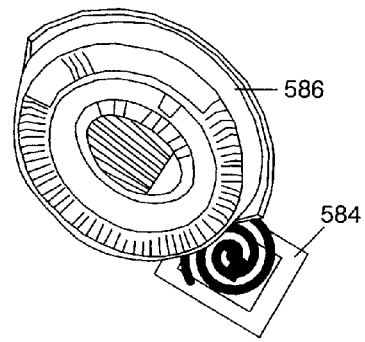
FIGS. 23A to 23C illustrate manipulation of a physical object positioned in the 3D input space to erase digital content.
Figure 23B:
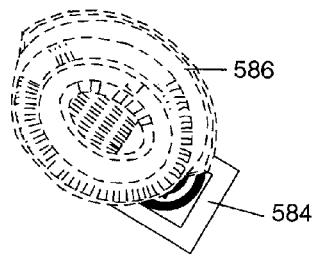
Figure 23C:
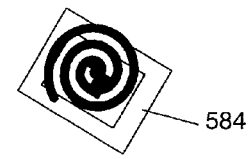

Various tools may be associated with markers for manipulating digital content. FIGS. 23A to 23C illustrate a "black hole" tool for erasing digital content displayed on the interactive surface 24. In FIG. 23A, when the marker associated with the "black hole" tool 584 is positioned within the 3D input space 60, the associated "black hole" tool appears in the displayed image. When the marker is manipulated in the 3D input space 60 to bring the "black hole" tool into the proximity of the digital content object 586 with a distance less than a predefined threshold, after a threshold period of time has passed with the "black hole" tool 584 proximate the digital content object, the computing device 28 recognizes an erase command. In response, the computing device 28 starts to shrink and fade-out the digital content object 586, as shown in FIG. 23B, and, as shown in FIG. 23C, eventually erases the digital content object from the image presented on the interactive surface 24.

FIG. 24A shows a magnifying glass tool 590 having a magnifying window 592. When the marker associated with the magnifying glass tool 590 is positioned within the 3D input space 60, the associated magnifying glass tool 590 appears in the image presented on the interactive surface 24. When the marker is manipulated in the 3D input space 60 to bring the magnifying glass tool 590 into proximity of the digital content object 594 and the magnifying window 592 is substantially overlapped with a portion of the digital content object 594, the computing device 28 in response presents a magnified image of the digital content object 594 in the magnifying window 592.

FIG. 24B shows a layer-view tool 596 having a layer-view window 598. The layer-view tool 596 is for use with digital content object 600 that comprises multiple layered images. In this example, the digital content object 600 comprises a second image 604 covered by a first image 602 so that the second image 604 is not displayed. When the marker associated with the layer-view tool 596 is positioned within the 3D input space 60 and manipulated such that the window 598 of the layer-view tool substantially overlaps with a portion of the digital content object 600 presented on the interactive surface 24, the portion of the second image 604 overlapped with the layer-view window 598 is displayed by the computing device 28. If the digital content object 600 comprises more than two layers, the user may apply a gesture, e.g., shaking gesture, to the layer-view tool 596 to see other layers. In some alternative embodiments, additional information of the digital content object 600 may also be shown by using the layer-view tool 596.

In some embodiments, multiple markers may be used to manipulate the same digital content object. FIG. 25 illustrates the interaction of digital content object 610, such as for example a 3D model of a city, by using two markers 612 and 614. As will be described later, the marker 612 determines the viewable portion of the digital content object 610, and the marker 614 representing a virtual camera, determines the detailed view of the digital content object 610.

As shown in FIG. 25, the digital content object 610 presented on the interactive surface 24 is zoomed to a user specified level so that only a detailed view of a portion of the digital content object 610 is displayed in a detailed-view window 616 (e.g., a SMART Notebook™ page or the entire interactive surface 24). A preview window 618 is overlapped with the detailed-view window 616 showing a full view of the digital content object 610. A rectangular box 620 inside the preview window 618 indicates the viewable portion of the digital content object 610. The content in the detailed-view window and the preview window may be different. For example, the preview window may show a 2D map of the digital content object 610, while the detailed-view window may show a 3D view of the digital content object 610.

The two markers 612 and 614 are used to interact with the digital content object 610 through manipulations of the markers within the 3D input space 60. The x-y coordinates of the marker 612 determine the position of the rectangular box 620 in the preview window 618, and thus determine the viewable portion of the digital content object 610. The marker 614 representing a virtual camera is shaped in such a way that it comprises a recognizable direction indicating the direction of the virtual camera view. The computing device 28 determines the direction of the marker 614 and the distance between the markers 612 and 614, which are then used to calculate the position and viewing direction of the virtual camera with respect to the digital content object 610. An image 622 of the virtual camera is displayed in the preview window 618 at the calculated position, which indicates the direction the virtual camera is viewing. The image of the digital content object 610 displayed in the detailed-view window 616 is also adjusted according to the position and the viewing direction of the virtual camera.

By moving the virtual camera marker 614 within the 3D input space 60, the user can freely move around within the viewable portion of the digital content object 610 and view perspectives thereof. The user may also move the marker 612 within the 3D input space 60 to select another portion of the digital content for viewing via the virtual camera.

The use of physical markers in the 3D input space 60 provides users great flexibility to manipulate digital content. As described above, the computing device 28 detects the movement, rotation and tilting of a marker and then determines the interaction to be applied to the associated digital content. In some embodiments, the interaction applied may be changing the position and/or angle of digital content, or replacing digital content with alternative digital content. In some other embodiments, the action of a marker may change parameters of the associated digital content.

For example, in some embodiments, the computing device 28 may interpret the rotation of a cube-shaped marker with respect to its z-axis (see FIG. 26A) as a command for changing the length of the associated digital content object, and may interpret the rotation of the marker with respect to its x-axis as a command for changing the color mix of the digital content object. Shown in FIG. 26B, digital content object 626 is associated with a marker in the form of a cube 624 (the marker patterns on the cube are not shown). When the user rotates the cube 624 about its z-axis as indicated by the arrow 628 within the 3D input space 60, as shown in FIG. 26C, the length of the digital content object 626 is increased. Rotating the cube 624 in the opposite direction decreases the length of the digital content object.

FIG. 26D shows digital content object 632 associated with a cube 630 (the marker patterns on the cube are again not shown) that is filled with two colors 634 and 636, where the color 636 fills in more area than the color 634. When the user rotates the cube 630 about its x-axis as indicated by the arrow 638 within the 3D input space 60, as shown in FIG. 26E, the area filled by the color 634 is increased and the area filled by the color 636 is decreased. Rotating the cube 630 in the opposite direction decreases the area filled by colour 634 and increases the area filled by colour 636.

FIG. 27A shows a digital content object 640 in the form of an e-book that is associated with two cubes 642 and 644, where the association is visually indicated by links 646 and 648, respectively. The user may rotate the markers 642 and 644 to the left and right as indicated by the arrows 650 and 652, respectively within the 3D input space 60 to manipulate the digital content object 640 (i.e. to open the ebook and leaf through its pages in either direction as shown in FIG. 27B).

FIG. 28A shows a digital content object 660 in the form of a cylinder that is associated with two cubes 662 and 664. The user may rotate the cubes oppositely with respect to the z-axis and, at the same time, move the cubes 662 and 664 towards each other to the new positions 670 and 672, as indicated by the arrows 666 and 668, respectively, within the 3D input space 60 to manipulate the digital content object 660. As shown in FIG. 28B, in response to cube movement within the 3D input space 60, the shape of the digital content object 660 is changed, i.e., twisted towards the new positions 670 and 672.

FIG. 29A shows a digital content object 676 in the form of a stadium that is associated with two cubes 678 and 680. The user may move the cubes 678 and 680 away from each other within the 3D input space 60 to manipulate the digital content object 676. As shown in FIG. 29B, in response to such cube movement within the 3D input space 60, the digital content object 676 is enlarged.

While manipulating the digital content object by using associated markers, rules may be applied to reject invalid operations based on the characteristics of the digital content.

For example, in FIG. 30A, where a digital content object 682 in the form of a stadium is associated with two cubes 684 and 686, the characteristics of the stadium 682 do not allow it to be twisted. Therefore, when the user moves the cubes 684 and 686 away from each other and, at the same time, rotates them oppositely with respect to the z-axis, within the 3D input space 60, as indicated by the arrows 688 and 690, respectively, the rotations of the markers are ignored. As shown in FIG. 30B, the stadium 682 is thus enlarged without twisting.

FIG. 31A shows another example where a digital content object 700 in the form of a globe is associated with a cube 702. According to the characteristics of the globe 700, only the rotation of the cube with respect to z-axis is accepted, which results in the globe rotating along its longitude. When the user rotates the cube imperfectly with the rotation axis not being parallel to the z-axis, e.g., as indicated by the arrow 704, the computing device 28 detects the rotation of the cube 702, and projects the rotation to the x-y plane to obtain the rotation vector with respect to the z-axis. Then, the computing device 28 applies the projected rotation vector to the digital content object 700. As shown in FIG. 31B, although the cube 702 is rotated and tilted within the 3D input space 60, the digital content object is rotated without tilting.

In some embodiments, the computing device 28 adapts the image of the digital content to the motion of the marker associated therewith. The digital content may comprise a set of predefined images or may be associated with a model such that the image of the digital content may be changed according to the rules of the model. When the marker associated with such digital content is manipulated in the 3D input space 60, the computing device 28 detects the motion of the marker and calculates parameters such as for example the velocity, acceleration, rotating/tilting angles, path, etc., as described above, and updates the image of the digital content to follow the motion of the marker in real-time. When updating the image of the digital content, the computing device 28 also modifies the image of the digital content by replacing the current image with another image from the set of images, or by replacing the current image with an image generated according to the rules of the associated model. The modification of the image of the digital content is based on the motion of the marker.

Figure 32:
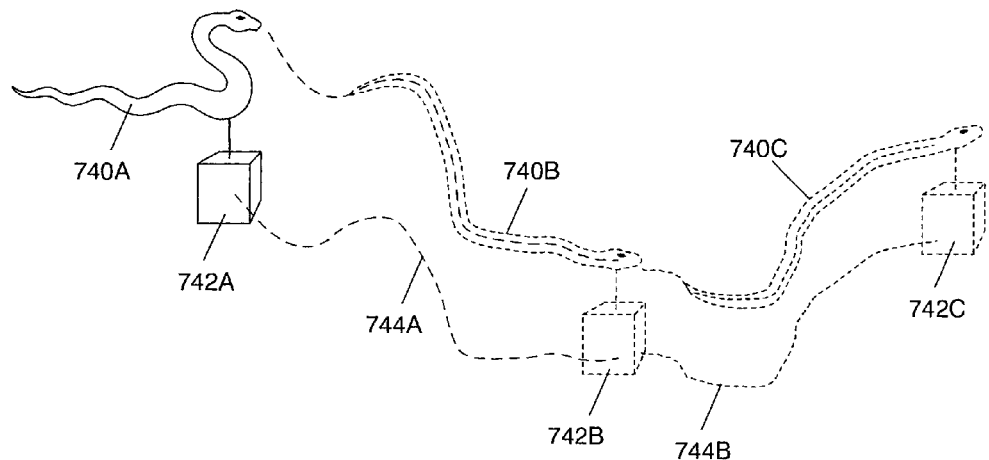
FIGS. 32 and 33 illustrate an animation method for manipulating digital content based on the motion of a physical object positioned in the 3D input space.

FIG. 32 shows an example of modifying the image of the digital content based the motion of the marker. A marker in the form of a cube placed at position 742A within the 3D input space 60 is associated with a 3D digital content object 740A in the form of a snake presented on the interactive surface 24. The user moves the cube from the position 742A to another place 740B in the 3D input space 60. The computing device 28 detects the movement of the cube, and calculates the path 744A between the two positions 742A and 742B. Then, the computing device 28 moves the snake 740A to a place corresponding to the marker's current position 740B, and modifies the image of the snake 740A to the image 740B such that the shape of the snake matches the path 744A. When the user moves the cube to the position 742C, the computing device 28 again calculates the path 744B, and then moves the snake to a position corresponding to the marker's position 742C and modifies the image of the snake to image 740C such that the image 740C matches the path 744B.

Figure 33:
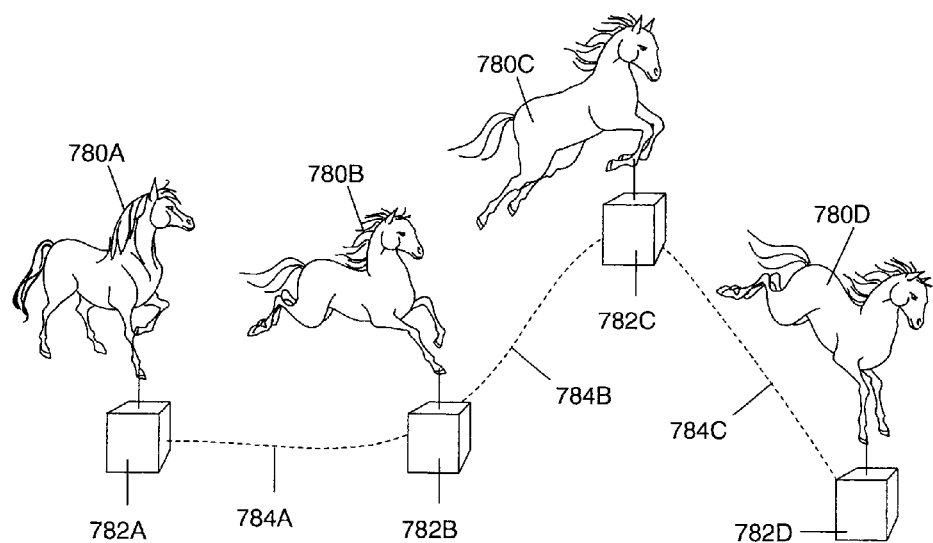

In FIG. 33, a 3D digital content object 780A in the form of a horse presented on the interactive surface 24 is associated with a cube at position 782A within the 3D input space 60. Because the cube is stationary, the image of the digital content shows the image of a standing horse. The user then moves the cube to a second position 782B within the 3D input space 60. The computing device 28 detects the movement of the cube, and calculates parameters of the marker, including the velocity of the marker and the path 784A. Then, the computing device 28 moves the horse to the position corresponding to the marker's current position 782B, and, because the velocity of the marker is not zero, updates the image of the digital content to a running horse 780B.

The user then moves the cube to a third position 782C which is higher than the previous position 782B within the 3D input space 60. The computing device 28 detects the movement of the cube, and calculates parameters of the marker, including the velocity of the marker and the path 784B. The velocity, which is a vector in 3D space, indicates that the cube is moving upward with a high speed. Therefore, the computing device 28 moves the horse to the position corresponding to the marker's current position 782C, and updates the image of the digital content to a horse with a pose of jumping up 780C.

The user then moves the cube to a fourth position 782D which is lower than the previous position 782C within the 3D input space 60. The computing device 28 detects the movement of the cube, and calculates parameters of the marker, including the velocity of the marker and the path 784C. The velocity indicates that the cube is moving downward with a high speed. Therefore, the computing device 28 moves the horse to the position corresponding to the marker's current position 782D, and updates the image of the digital content to a horse with a pose of jumping down 780D.

Figure 34A:
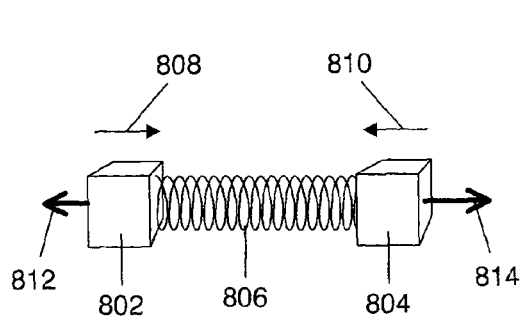
FIGS. 34A to 34C show an example of a mixed reality application for illustrating physics principles by manipulating two physical objects positioned in the 3D input space.
Figure 34B:
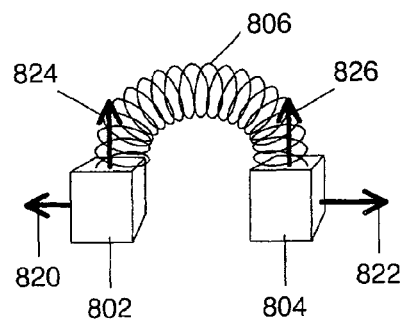
Figure 34C:
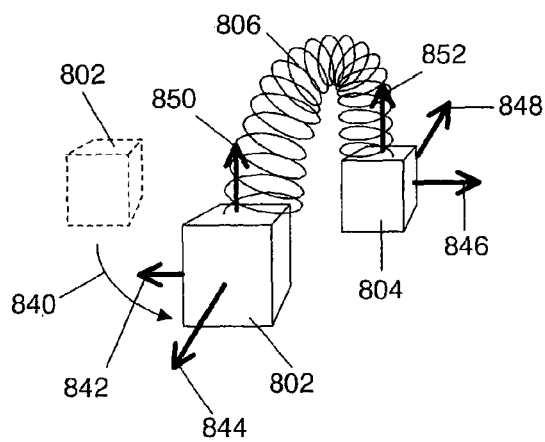

In some embodiments, the interactive input system 20 may be used in education, e.g., teaching physics or asking students to answer questions. FIGS. 34A to 34C show a digital content object 806 in the form of a spring coil presented on the interactive surface 24 associated with two markers 802 and 804 positioned in the 3D input space 60. In FIG. 34A, the user moves the markers 802 and 804 towards each other within the 3D input space 60, as indicated by the arrows 808 and 810, respectively. In response, the digital content object 806 is updated by the computing device 28 to show an image of a compressed spring coil, together with two arrows 812 and 814 at each end of the spring coil 806, respectively, to indicate the force generated in the compressed spring coil 806.

In FIG. 34B, the user manipulates the markers 802 and 804 to bend the spring coil 806, using the method described above. Then, the computing device 28 updates the image of the digital content 806 to show a bent spring coil, and shows four arrows 820 to 826 to indicate the force generated in the spring coil 806.

In FIG. 34C, the user moves the marker 802, as the arrow 840 indicates, to twist the spring coil 806. Then, the computing device 28 updates the image of the digital content 806 to show a twisted spring coil, and shows six arrows 842 to 852 to indicate the force generated in the spring coil 806.

Figure 35:
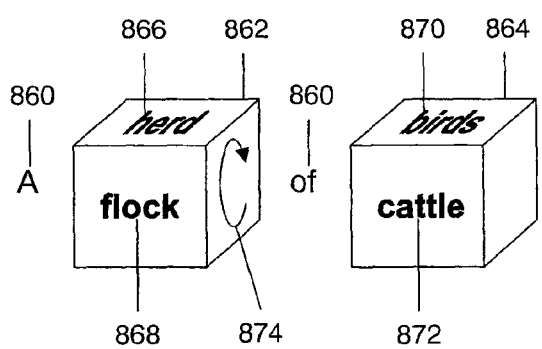
FIG. 35 shows a method of manipulating a physical object positioned in the 3D input space to answer a question.

FIG. 35 shows two cubes 862 and 864. Each surface of each cube comprises a marker pattern (not shown), and is associated with a word, e.g., the words 866 to 872 as shown. A number of words 860 are also displayed on the interactive surface 24. The user is required to rotate the cubes to certain positions within the 3D input space 60 such that the words associated with the surfaces of the cubes facing the camera 54 match the words 866 to 872 in the prescribed order. The computing device 28 in this case ignores translations of the cubes 862 and 842, but processes rotations thereof. After a threshold time period has passed with the cubes positioned as described above, the computing device 28 determines whether the user's answer is correct or not. An audio or video indication of correctness is then provided.

Figure 36A:
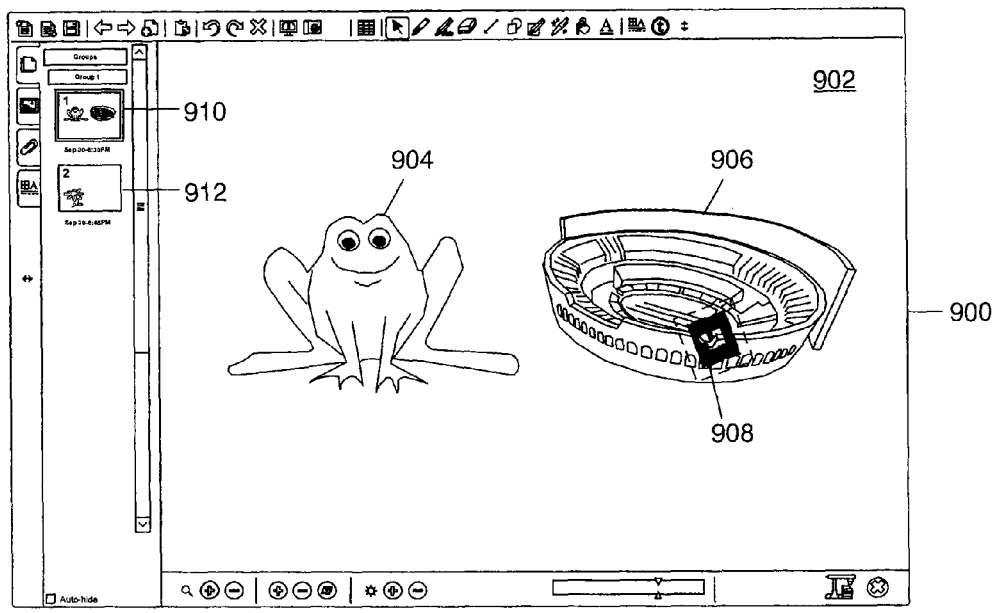
FIGS. 36A and 36B illustrate a method of switching a content page in a mixed reality mode.
Figure 36B:
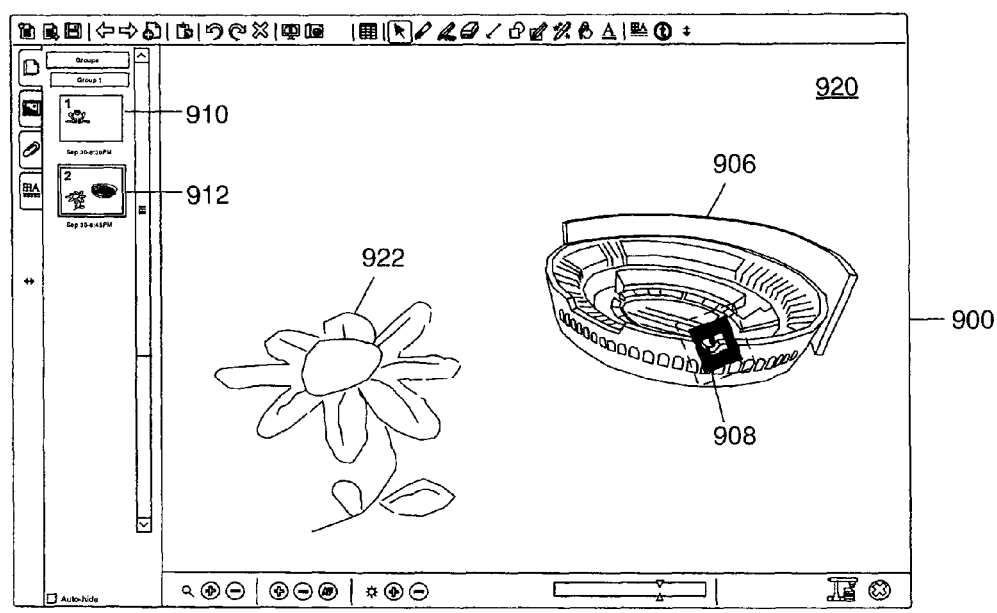

The interactive input system allows the user to switch to another SMART Notebook™ page while the MR mode is turned on. FIGS. 36A and 36B show a SMART Notebook™ program window 900 that comprises two pages 902 and 920 associated with page thumbnails 910 and 912, respectively. In FIG. 36A, page 902 is the current page, which is indicated by the thick border of page thumbnail 910. The current page 902 is in the MR mode. The MR window, in the form of a transparent window, is overlaid on a SMART Notebook™ page that comprises two digital content objects 904 and 906.

The digital content object 904 is not associated with a marker, and the digital content object 906 is selected by the marker 908.

The user may select or click on the page thumbnail 912 to switch to page 920. As shown in FIG. 36B, the content of page 920 is shown on the interactive surface 24 when page thumbnail 912 is selected. The page thumbnail 910 is changed to a thin border, and the page thumbnail 912 is changed to a thick border. After page 920 becomes the current page, it is automatically conditioned to the MR mode, and the MR window is overlaid thereon. The digital content of page 920, e.g., the content object 922, is brought into the MR window. Digital content not associated with any marker when page 902 was the current page remain in page 902 when the current page is switched to page 920. Digital content associated with or selected by markers are moved to page 920 with the MR window. For example, digital content object 904 is left in page 902, while digital content object 906, which is selected by the marker 908, is moved to page 920 with the MR window.

Figure 37A:
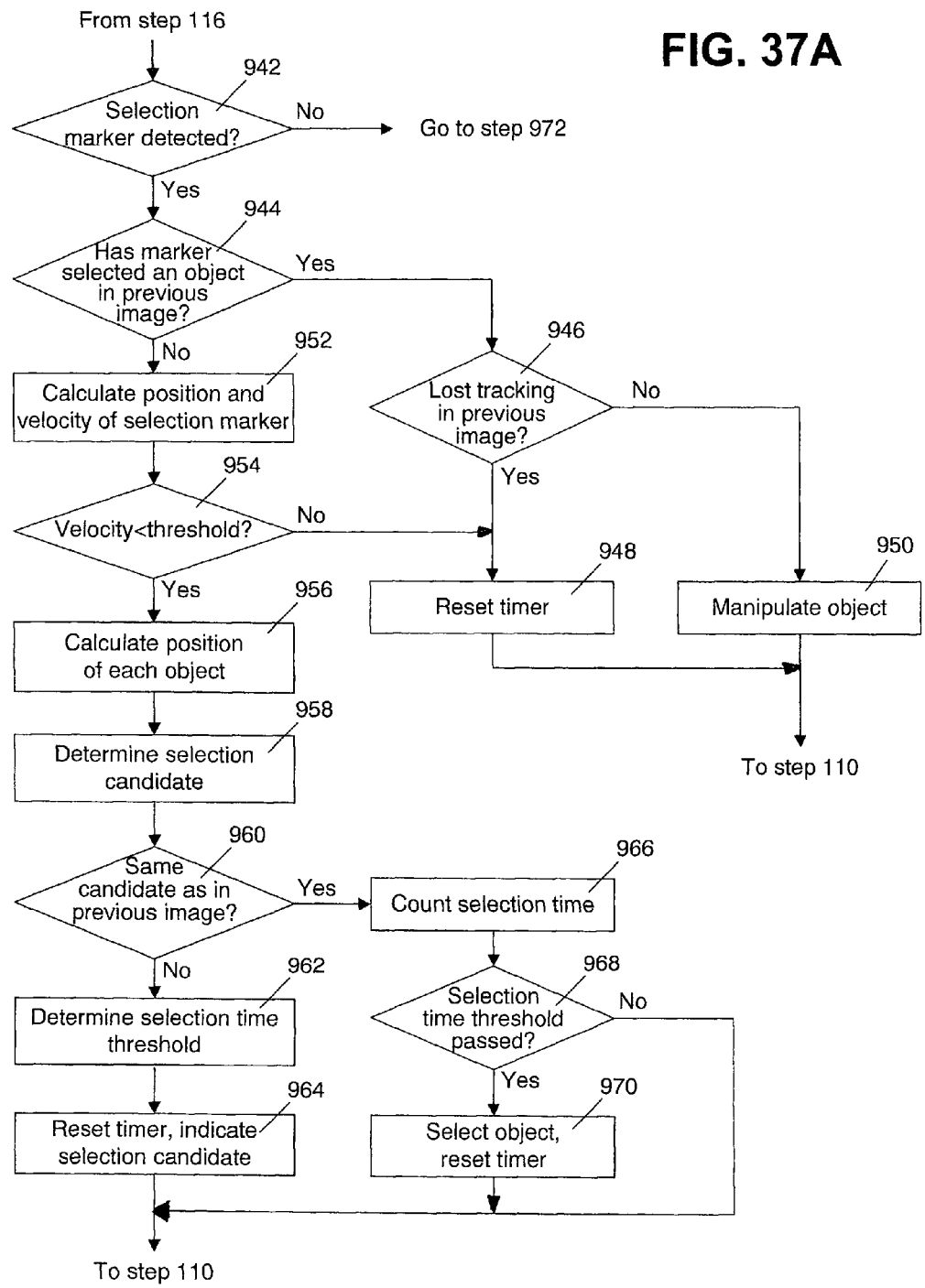
FIGS. 37A and 37B illustrate a flowchart showing steps performed during selection or deselection of a digital content object.
Figure 37B:
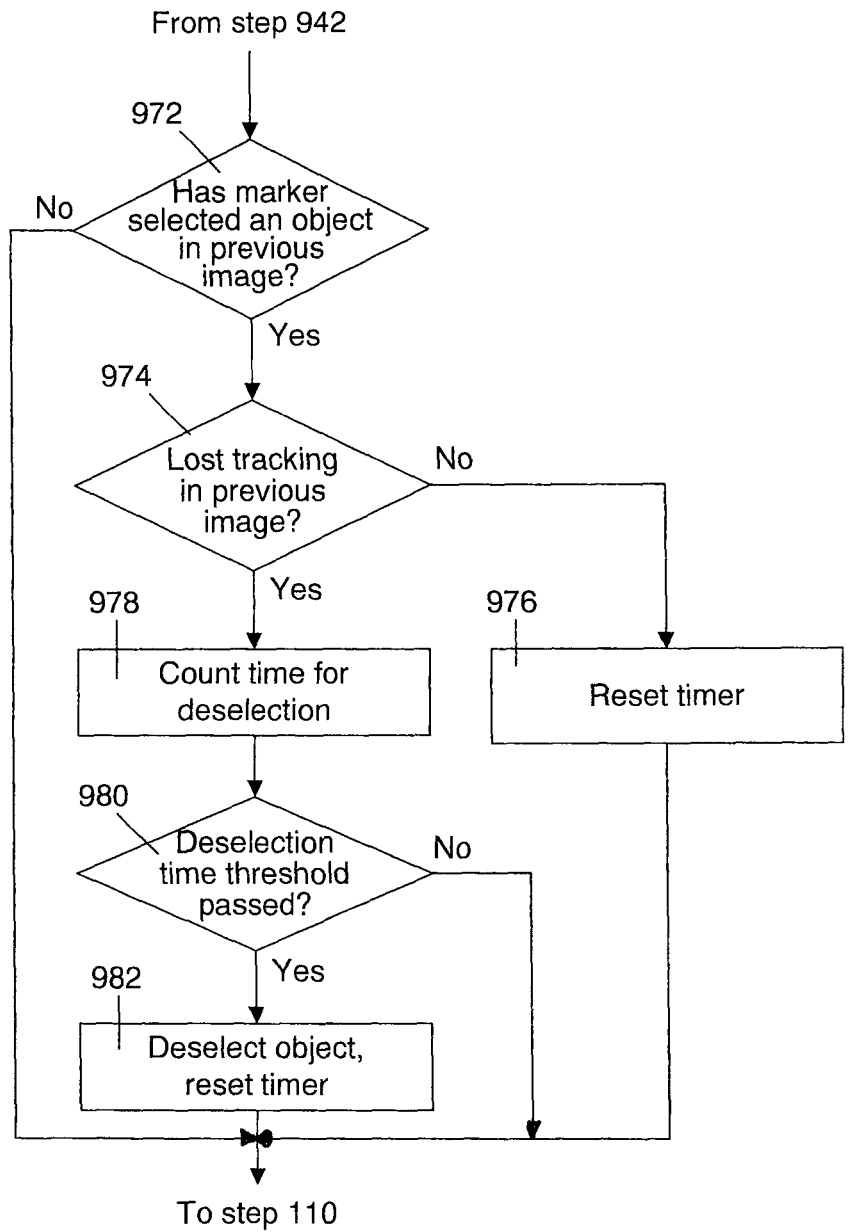

In another embodiment, a physical selection marker 1032 is used to select a digital content object 1022 to 1030 closest thereto, as will be described with reference to FIGS. 37A to 38F. FIGS. 37A and 37B show the exemplary steps performed by the interactive input system 20 during MR processing (step 118 in FIG. 2A) to select or deselect a digital content object 1022 to 1030. The computing device 28 maintains a timer to confirm the selection or deselection of a digital content object 1022 to 1030 based on a selection or deselection time threshold, respectively. In this embodiment, the selection time threshold is determined based on the distance between the selection marker 1032 and the digital content object 1022 to 1030 to be selected. The deselection time threshold is typically predefined but may be modified by the user via system 20 settings.

At step 942, the computing device 28 checks whether the pattern of the selection marker 1032 is recognized. If the pattern of the selection marker 1032 is recognized, the computing device 28 then checks whether the selection marker 1032 has selected a digital content object 1022 to 1030 in the previous image (step 944). If the selection marker 1032 has selected a digital content object 1022 to 1030 in the previous image, the computing device 28 further checks whether the tracking of the selection marker 1032 was lost in the previous image, i.e., the selection marker 1032 was not detected and thus assigned the "Maybe Not Tracked" or "Definitely Not Tracked" state in the previous image (step 946). If the tracking of the selection marker 1032 was not lost in the previous image, the computing device 28 then calculates the position, direction and velocity of the selection marker 1032 within the 3D input space 60, and manipulates (e.g., moves, rotates and/or tilts) the selected digital content object 1022 to 1030 accordingly (step 950). The process then proceeds to step 110 to capture the next image of the 3D input space 60.

If at step 946, the tracking of the selection marker 1032 was lost in the previous image, the computing device 28 then resets the timer (step 948). At this step, any timing indication, if displayed in the MR window, is also deleted. The process then proceeds to step 110 to capture the next image of the 3D input space 60.

If at step 944, the selection marker 1032 has not selected any digital content object 1022 to 1030 in the previous image, the computing device 28 calculates the position and velocity of the selection marker 1032 (step 952). In this embodiment, the computing device 28 projects the selection marker 1032 to a 2D plane, e.g., the bottom surface 80 of the 3D input space 60, and then calculates its position and velocity on the 2D plane. Then, the computing device 28 checks whether the velocity of the selection marker 1032 is less than a velocity threshold (step 954). If not, the computing device 28 resets the timer (step 948). At this step, any timing indication, if displayed in the MR window, is also deleted.

If at step 954, the velocity of the selection marker 1032 is less than the predefined velocity threshold, the computing device 28 calculates the position of each digital content object 1022 to 1030 (step 956). In this embodiment, if a digital content object 1022 to 1030 is a 3D content object, the computing device 28 projects it to the aforementioned 2D plane, and then calculates its position thereon. At step 958, the computing device 28 uses the positions of the selection marker 1032 and the digital content objects 1022 to 1030 to determine a selection candidate. In this embodiment, the computing device 28 calculates the distance between the geometric center of the selection marker 1032 and the geometric center of each digital content object 1022 to 1030, and chooses the digital content object 1022 to 1030 closest to the selection marker 1032 as the selection candidate.

At step 960, the computing device 28 checks whether the selection candidate is the same selection candidate as in the previous image. If the selection candidate is not the same selection candidate as in the previous image, i.e., a new selection candidate is chosen, the computing device 28 then calculates a selection time threshold based on the distance between the selection marker 1032 and the selection candidate (step 962). The selection time threshold may be within a defined range (e.g., 1 second to 90 seconds), and is generally closer to the minimum bound when the selection marker 1032 is closer to the selection candidate, and is generally closer to the maximum bound when the selection marker 1032 is farther to the selection candidate. In this embodiment, a linear function may be used to calculate the selection time threshold based on the distance between the selection marker 1032 and the selection candidate. However, those skilled in the art will appreciate that other functions, such as for example a nonlinear function, may also be used in alternative embodiments.

At step 964, the computing device 28 resets the timer, and updates the display of the MR window to indicate the selection candidate, e.g., displaying a line connecting the selection marker 1032 and the selection candidate, and displaying the bounding box of the selection candidate. Then, the process proceeds to step 110 to capture the next image of the 3D input space 60.

If at step 960, the selection candidate is the same selection candidate as in the previous image, the computing device 28 then counts time for confirming selection using the timer (step 966). That is, if the timer has not started yet, the computing device 28 starts the timer, and displays a timing indication in the MR window; if the timer has started, it continues counting and updates the timing indication display accordingly. At step 968, the computing device 28 checks whether the time of the timer has exceeded the selection time threshold. If the selection time threshold has not elapsed, the process proceeds to step 110 to capture the next image of the 3D input space 60. Otherwise, the computing device 28 associates the selection candidate to the pattern of the selection marker 1032, updates the display of the MR window to indicate that the selection marker 1032 has selected the selection candidate, and resets the timer (step 970). The process then proceeds to step 110 to capture the next image of the 3D input space 60.

If at step 942, the selection marker 1032 is not been detected, the process proceeds to step 972 in FIG. 37B, where the computing device 28 checks whether the selection marker 1032 has selected a digital content object 1022 to 1030 in the previous image. If not, the process proceeds to step 110 to capture the next image of the 3D input space 60. However, if the selection marker 1032 has selected a digital content object 1022 to 1030 in the previous image, the computing device 28 then checks whether the tracking of the selection marker 1032 was lost in the previous image, i.e., the selection marker 1032 was not detected and thus assigned the "Maybe Not Tracked" or "Definitely Not Tracked" state in the previous image (step 974). If tracking of the selection marker 1032 was not lost in the previous image, the computing device 28 resets the timer (step 976), and the process then proceeds to step 110 to capture the next image of the 3D input space 60.

If at step 974, the tracking of the selection marker 1032 was lost in the previous image, the computing device 28 then counts time for confirming deselection using the timer (step 978). That is, if the timer has not started yet, the computing device 28 starts the timer, and displays a timing indication in the MR window; if the timer has started, it continues counting and updates the timing indication display accordingly. At step 980, the computing device 28 checks whether the elapsed time of the timer has reached the deselection time threshold. If the deselection time threshold has not elapsed, the process proceeds to step 110 to capture the next image of the 3D input space 60; otherwise, the computing device 28 deletes the association between the selection marker 1032 and the selected digital content object 1022 to 1030, updates the display of the MR window to indicate that the selected digital content object 1022 to 1030 has been deselected, and resets the timer (step 982). The process then proceeds to step 110 to capture the next image of the 3D input space 60.

Figure 38A:
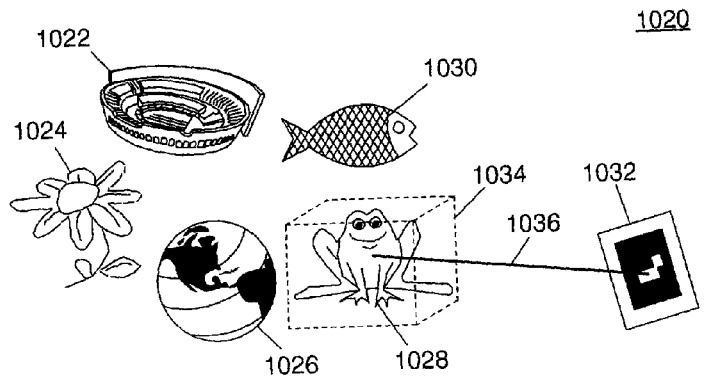
FIGS. 38A to 38C illustrate an example of selecting a digital content object by using a selection marker.
Figure 38B:
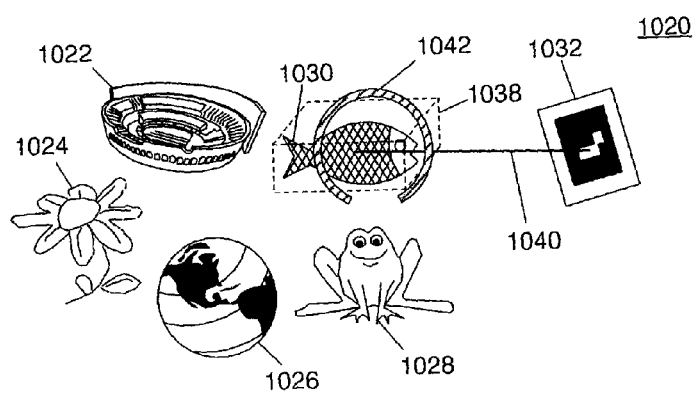
Figure 38C:
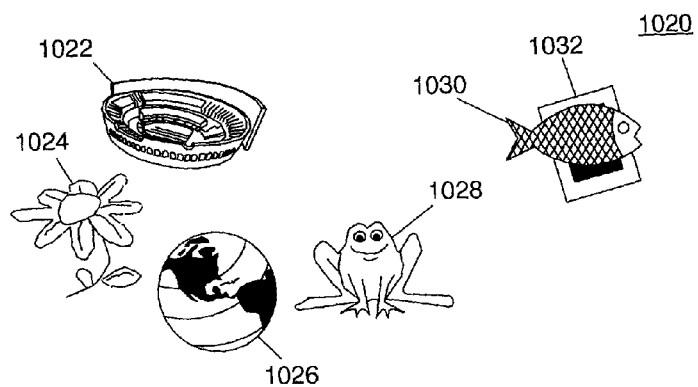

FIGS. 38A to 38C illustrate an example of selecting a digital content object using a selection marker 1032. In this example, five (5) digital content objects 1022 to 1030 are displayed in the MR window 1020. As shown in FIG. 38A, a selection marker 1032 is moved into the 3D input space 60 with a velocity slower than the velocity threshold. As described above, the computing device 28 calculates the distance between the selection marker 1032 and each of the digital content objects 1022 to 1030, and determines which of the digital content objects 1022 to 1030 is closest to the selection marker 1032. The digital content object 1028 is found to be closest to the selection marker 1032 and is subsequently chosen as the selection candidate. A bounding box 1034 is created about the digital content object 1028 indicating the digital content object 1028 as the selection candidate, and a line 1036 is drawn in the MR window connecting the selection marker 1032 and the selection candidate object 1028. As shown in FIG. 38B, the user moves the selection marker 1032 to another location. After calculating the distance between the selection marker 1032 and each digital content object 1022 to 1030, the computing device 28 determines that the digital content object 1030 is now closest to the selection marker 1032. Thus, the digital content object 1030 is chosen as the selection candidate and a bounding box 1038 is created about the digital content object 1030, and a line 1040 is displayed in the MR window connecting the selection marker 1032 and the selection candidate object 1030. Then, the computing device starts the timer to count the time for confirming selection, and displays a timing indication 1042 over the object 1030, which is a portion of a circle in this example, that grows as the timer counts. The timing indication 1042 is updated at a rate determined by the selection time threshold, and therefore is faster when the selection marker 1032 is closer to the selection candidate, and slower otherwise. When the timing indication 1042 grows to a full circle, indicating that the selection time threshold has been exceeded, the selection candidate object 1030 is then selected by the selection marker 1032. The computing device 28 updates the display of the MR window to indicate the selection of the digital content object 1030, as shown in FIG. 38C, by moving the digital content object 1030 to a position over the image of the selection marker 1032, and deletes the timing indication 1042, the bounding box 1038 of the object 1030 and the line 1040 from the display. After selection, the user may manipulate the selected object 1030 (e.g., move it to another location in the MR window), or deselect it as described previously.

Figure 38D:
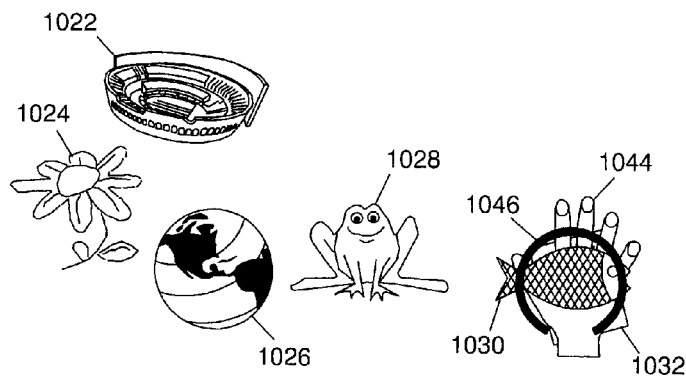
FIGS. 38D and 38E illustrate an example of deselecting a selected digital content object.
Figure 38E:
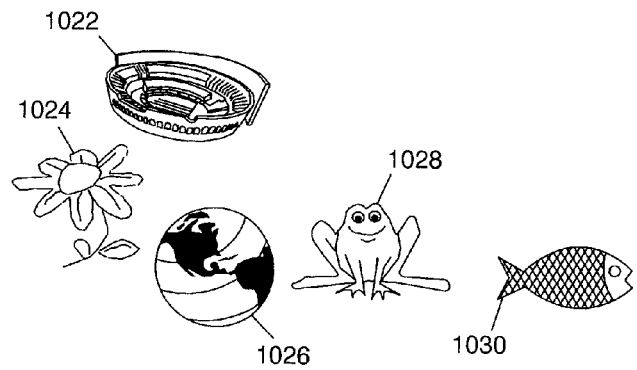

FIGS. 38D and 38E illustrate an example of deselecting the selected object 1030, which is selected by the selection marker 1032 in the example shown in FIGS. 38A to 38C. As shown in FIG. 38D, the user introduces a hand 1044 to the 3D input space 60 to cover the selection marker 1032 from the camera 54, and as a result, the tracking of the selection marker 1032 is lost. The computing device 28 thus starts the timer to count the time for confirming deselection, and displays a timing indication 1046. In this example, the timing indication 1046 is a growing portion of a circle over the hand 1044, the circle having a different color to that of the timing indication 1042 used for confirming selection. When the timing indication grows to a full circle, indicating that the deselection time threshold has elapsed, the object 1030 is then deselected. The computing device 28 updates the display by deleting the timing indication 1046 therefrom. The user may move the selection marker 1032 and the hand 1044 within the 3D input space 60 without affecting the object 1030, as shown in FIG. 38E.

Figure 38F:
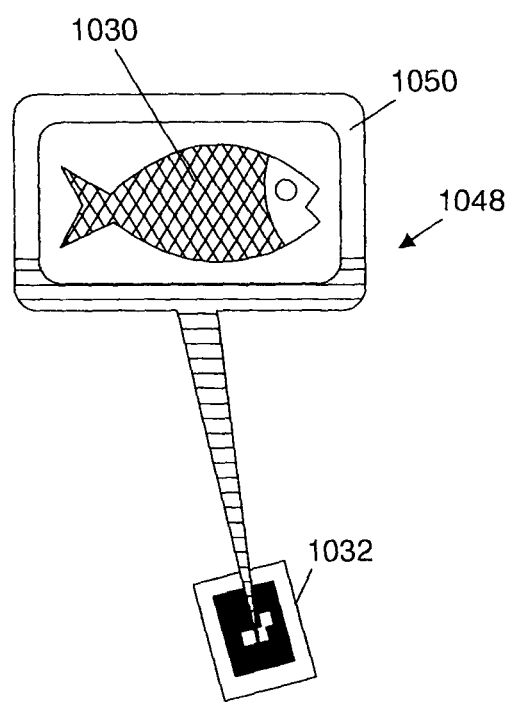
FIG. 38F illustrates another example of selecting a digital content object by using a selection marker.

In other embodiments, the timing indication for selection may be associated with other visualizations. For example, as shown in FIG. 38F, a timing indication 1048 may comprise a bounding box 1050 that extends from the image of the marker 1032 and encloses the selection candidate, e.g., the digital content object 1030. As the timer counts the time for selection, the outline of the box 1050 gradually becomes increasingly more solid. When the entire outline is solid, selection of the selection candidate is confirmed. Alternatively, the color of the bounding box 1050 may gradually change. Still alternatively, the digital content object 1030 may gradually progress towards the selection marker 1032 until it overlays the selection marker 1032 indicating a complete selection. Correspondingly, opposite techniques may be used for deselection.

Those skilled in the art will appreciate that various alternative embodiments are readily available. Although the interactive board 22 is described as being mounted on a vertical support surface, those of skill in the art will appreciate that the interactive board may be supported on a stand or other suitable framework or suspended from overhead structure. Of course interactive boards employing other machine vision configurations, analog resistive, electromagnetic, capacitive, acoustic or other technologies to register pointer input may be employed. Also, rather than taking a vertical configuration, the interactive board may be in the form of a touch table comprising a horizontal oriented interactive surface.

In some alternative embodiments, the interactive input system may comprise no 2D input device. In this case, a projector 38 may be used with a display surface (e.g., a projection screen) to display images output by the computing device 28.

Although in above embodiments, fade-in/fade-out are used as the transition effects, those of skill in the art will appreciate that other transition effects may be employed. For example, instead of using a fade-in effect, a zoom-in effect may be used, with which digital content is brought onto the display with an effect of scaling up from a minimum size to its maximum size. Instead of using a fade-out effect, a zoom-out effect may be used, with which digital content is removed from the display by scaling it from its current size to a tiny size and then disappear.

Although in above embodiments, the shaking gesture is interpreted by the computing device 28 as changing the digital content object currently associated with the marker to another digital content object, in some alternative embodiments, the shaking gesture may be interpreted by the computing device 28 as separating the associated digital content object from the marker and inserting it into a canvas page. In some other alternative embodiments, the shaking gesture may be interpreted as disassociating the digital content object from the marker and from the image presented on the interactive surface 24.

In some alternative embodiments, the clipping plane gesture is used to disassociate a marker with a digital content object such that the digital content object associated with a marker is disassociated with the marker and left in the image presented on the 2D interactive surface 24 when the marker is moved out of the 3D input space 60.

Although in above embodiments, the 3D input space is defined as a pyramidal frustum shape, those of skill in the art will appreciate that the 3D input space may take other 3D shapes such as for example, a cube, a cylinder or a sphere. In this case, clipping planes, where appropriate, are also properly defined according to the shape of the 3D interactive space.

Those skilled in the art will appreciate that, in some alternative embodiments, while a pattern is recognized and the associated digital content is inserted into the image presented on the interactive surface, when a pattern is recognized the associated digital content may be deleted from the image presented on the interactive surface.

Those of skill in the art will appreciate that the above description of the toolbar for controlling the MR environment is for illustrative purpose only. Other functions are also available, and the toolbar may comprise more or less functions than the above description. In some alternative embodiments, the camera icon 196 (see FIG. 3B) may take the form of a button that allows the user to switch between the MR mode and a normal camera mode in which images captured by the camera 54 are shown in the SMART Notebook™ program window without entering the MR mode. In other alternative embodiments, the icon 196 changes between a camera icon and a mixed reality marker pattern icon, to indicate to the user the current camera mode (the normal camera mode or the MR mode).

In some alternative embodiments, a line segment may or may not be used to connect the 3D content to the selection marker, to show the user that the association has been created.

In some alternative embodiments, the user can be interacting with any application running on the computing device 28 before entering into the mixed reality mode. Once the marker pattern has been recognized by the computing device 28, a transition to the mixed reality mode is activated and displayed to the user. An automatic URL may be activated upon recognition of a mixed reality marker.

In some alternative embodiments, the cube-shaped marker employing LCD panels can have multiple buttons for additional functionality. Additional functionality can include for example an on/off, select content, disassociate content, etc. function. Those of skill in the art will also appreciate that not all LCD panels of the cube-shaped marker need to be active when the button is pushed. The top facing LCD panel of the cube-shaped marker can be active while the other LCD panels remain markerless.

In some alternative embodiments, the LCD panels will begin in an "off" state. By moving the LCD panels within the 3D input space to bring the image of the LCD panels to within the defined proximity of 3D content, and triggering the button to turn on the LCD panels, the 3D content will become associated with the marker pattern displayed on the top LCD panel. When the LCD panel is turned "off", the marker will become disassociated with the 3D content.

Although in above description, a menu comprising a set of predefined digital content may be opened by the manipulation of a physical object, those skilled in the art will appreciate that other types of menus may also be opened by the manipulation of a physical object. For example, a menu comprising a set of text-based menu items may be opened, and a menu item may be selected by the manipulation of a physical object.

Although in the embodiment shown in FIG. 37A, the selection time threshold is determined at the time a new selection candidate is chosen (at step 962), in another embodiment the selection time threshold may be calculated at step 958 so that it is instantly updated with the change of distance between the selection marker 1032 and the selection candidate. Alternatively, a fixed selection time threshold may be used.

Although in above embodiments, the time indicator are represented by a portion of a circle that grows to a full circle, those skilled in the art will appreciate that other timing indicators may also be used. Also, the timing indicators may be static images, an animation or an audio clip, depending on system design. Those skilled in the art will also appreciate that the timing indicators for confirming selection and deselection may be different, as described above, or may be the same, depending on system design.

Although in the embodiment shown in FIG. 37A, a selection candidate is determined only if the velocity of the selection marker 1032 is less than a velocity threshold, in another embodiment no velocity threshold is used, and the system always chooses a selection candidate when the selection marker 1032 is detected within the 3D input space.

Although in above embodiments, the distance between the selection marker 1032 and a digital content object 1022 to 1030 is calculated as the distance between the centers thereof, in another embodiment the distance may be calculated using other criteria, e.g., as the shortest distance between the boundary of the selection marker 1032 and that of the digital content.

Although in above embodiments, the computing device 28 automatically turns on the MR mode when a pattern is recognized, and automatically turns off the MR mode when no pattern is recognized for a time period longer than a time threshold, in another embodiment the computing device 28 turns on/off the MR mode only when it receives a command. Such a command may be triggered by selecting or clicking of a button, a gesture, or any appropriate use interface means.

In some alternative embodiments, the interactive board 22 comprises a 3D projector to project stereoscopic 3D images on the interactive surface 24, or comprises a 3D display to present stereoscopic 3D images, depending on the system design. In these embodiments, the computing device 28 calculates the position of the selection marker image in the stereoscopic 3D image based on the position of the selection marker in the 3D input space 60. The selection marker selects digital content objects as described above. In some other embodiments, stereoscopic 3D images are displayed in a 3D display space using a proper 3D display, e.g., Dreamoc™ 3D display offered by RealFiction of Denmark. In one embodiment, the 3D display space is also used as the 3D input space 60. The computing device 28 calculates the position of the selection marker image in the stereoscopic 3D image based on the position of the selection marker in the 3D input space 60. The selection marker is used to select digital content objects as described above.

Although embodiments have been described above with reference to the accompanying drawings, those of skill in the art will appreciate that variations and modifications may be made without departing from the scope thereof as defined by the appended claims.

What is claimed is:

1. An interactive input system, comprising:
   a computing structure; and
   an input device configured to detect at least one physical marker having a recognizable pattern thereon within a three-dimensional (3D) input space and to provide output to said computing structure, wherein said computing structure is configured to process the output of the input device to:
      visually recognize the pattern on the at least one physical marker in the 3D input space partially based on reference images in a pattern library;
      assign a tracking state to the at least one physical marker indicating a level of detection by the input device of the at least one physical marker in the 3D input space;
      determine digital content associated with the recognized pattern; and
      modify an image presented on a display surface by applying a transition to the determined digital content based on the assigned tracking state in response to movement of the at least one physical marker within the 3D input space.

2. The interactive input system of claim 1, wherein the computing structure is configured to process the output of the input device to detect at least one of orientation, position and movement of the at least one physical marker in the 3D input space.

3. The interactive input system of claim 1, wherein when the detected state of the at least one physical marker signifies that a new recognizable physical marker is positioned in the 3D input space, the image is modified to add associated digital content to the image, the added associated digital content appearing in the image using a visual effect.

4. The interactive input system of claim 3, wherein the visual effect is a fade-in visual effect or a scale-up visual effect.

5. The interactive input system of claim 3, wherein when the detected state of the at least one physical marker signifies a lost physical marker in the 3D input space whose position has been relocated, the image is modified to add associated digital content to the image using the visual effect.

6. The interactive input system of claim 1, wherein when the detected state of the at least one physical marker signifies removal of a previously recognized physical marker from the 3D input space, the image is modified to remove associated digital content from the image, the associated digital content disappearing from the image using a different visual effect.

7. The interactive input system of claim 6, wherein the different visual effect is a fade-out visual effect or a scale-down visual effect.

8. The interactive input system of claim 6, wherein when the detected state of the at least one physical marker signifies a physical marker in the 3D input space whose tracked position has been lost, the image is modified to remove the associated digital content from the image using the different visual effect.

9. The interactive input system of claim 1, wherein the computing structure further process the output of the input device to detect physical marker gestures.

10. The interactive input system of claim 9, wherein said computing structure is configured to manipulate digital content associated with the physical marker in response to detected gestures.

11. The interactive input system of claim 10, wherein said computing structure, in response to a detected gesture, is configured to one of (i) changes associated digital content, (ii) merges associated digital content, (iii) clone associated digital content, (iv) disassociate digital content, (v) associate digital content, and (vi) rotates digital content.

12. The interactive input system of claim 1, wherein the at least one physical marker is a card, cube or other physical object having a least one surface carrying said pattern thereon.

13. The interactive input system of claim 12, wherein the at least one physical marker comprises more than one surface, at least some of said surfaces carrying different patterns thereon.

14. The interactive input system of claim 12, wherein said at least one physical marker comprises at least one display surface on which a pattern is presented.

15. The interactive input system of claim 1, wherein said input device is a camera device capturing images of said 3D input space.

16. The interactive input system of claim 1, further comprising an interactive surface on which said image is displayed.

17. An apparatus, comprising:
   a processing device receiving data representing a physical marker having a recognizable pattern thereon positioned within a three-dimensional (3D) input space; and
   one or more memory devices storing computer program code executable by the processing device, the processing device communicating with the one or more memory devices and executing the program code causing the apparatus at least to:
      visually recognize the pattern on the physical marker in the 3D input space partially based on reference images in a pattern library;
      assign a tracking state to the physical marker indicating a level of detection of the physical marker within the 3D input space;
      determine digital content associated with the recognized pattern;
      modify image data by applying a transition to the determined digital content based on the assigned tracking state of the physical marker and in response to movement of the physical marker within the 3D space; and output the modified image data for presentation on a display surface.

18. A method comprising:
detecting a physical marker having a unique pattern thereon within a three-dimensional (3D) input space;
visually recognizing the physical marker partially based on a pattern library that includes reference images associated with the unique pattern;
assigning a tracking state of the physical marker indicating a level of detection of the physical marker in the 3D input space;
determining digital content associated with the recognized unique pattern; and
modifying image data used to present an image on a display surface based on the assigned tracking state of the physical marker and in response to movement of the physical marker within the 3D input space, wherein said modifying comprises applying a transition effect to the determined digital content.

19. An interactive input system, comprising:
a computing structure; and
an input device configured to detect at least one physical marker having a recognizable pattern thereon within a three-dimensional (3D) input space and to provide output to said computing structure, wherein said computing structure is configured to process the output of the input device to:
visually recognize the pattern on the at least one physical marker in the 3D input space partially based on reference images in a pattern library;
determine when the location of the pattern within the 3D input space and the location of digital content in an image presented on a display surface satisfy defined criteria; and
associate the pattern to the digital content.

20. The interactive input system of claim 19, wherein a cursor is assigned to said pattern and is presented in said image at a location corresponding to the position of said pattern within said 3D input space, said computing device configured to determine when the pattern is moved within the 3D input space to bring said cursor into a threshold distance from said digital content.

21. The interactive input system of claim 20, wherein the computing structure is further configured to determine if the cursor is positioned from said digital content by said threshold distance for a threshold period of time before associating the pattern with the digital content.

22. The interactive input system of claim 19 wherein said input device is a camera device configured to capture images of said 3D input space.

23. The interactive input system of claim 19, further comprising an interactive surface on which said image is presented.

24. The interactive input system of claim 19, wherein the computing structure is further configured to process the output of the input device to detect physical marker gestures.

25. The interactive input system of claim 24, wherein said computing structure is configured to manipulate digital content associated with the physical marker in response to detected gestures.

26. The interactive input system of claim 25, wherein said computing structure, in response to a detected gesture, is configured to one of (i) change associated digital content, (ii) merge associated digital content, (iii) clone associated digital content, (iv) disassociate digital content, (v) associate digital content, and (vi) rotate digital content.

27. An apparatus comprising:
a processing device receiving data representing a physical marker having a recognizable pattern thereon positioned within a three-dimensional (3D) input space; and
one or more memory devices storing computer program code executable by the processing device, the processing device communicating with the one or more memory devices and executing the program code causing the apparatus at least to:
visually recognize the pattern on the at least one physical marker in the 3D input space partially based on reference images in a pattern library;
determine when the location of the pattern within the 3D input space and the location of digital content in an image presented on a display surface satisfy defined criteria; and
associate the pattern to the digital content.

28. The apparatus according to claim 27, wherein said processing device generates an indication signifying said association.

29. The apparatus according to claim 28, wherein said indication is a visual indicator.

30. A method, comprising:
detecting a physical marker having a unique pattern thereon within a three-dimensional input space;
recognizing the physical marker partially based on a pattern library that includes reference images associated with the unique pattern;
determining when the location of the pattern within the input space and the location of digital content within a presented image satisfy defined criteria; and
associating the pattern to the digital content so that manipulation of the physical marker within the input space manipulates the digital content.

31. An interactive input system comprising:
a computing structure; and
an input device configured to detect at least two physical markers, each having a recognizable pattern thereon, within a three-dimensional (3D) input space and to provide output to said computing structure, wherein said computing structure is configured to process the output of the input device to:
visually recognize the patterns on the at least two physical markers in the 3D input space partially based on reference images in a pattern library; and
associate the patterns with one digital content.

32. The interactive input system of claim 31, wherein the computing structure further process the output of the input device to detect physical marker gestures.

33. The interactive input system of claim 32, wherein said computing structure is configured to manipulate digital content associated with the physical marker in response to detected gestures.

34. An apparatus, comprising:
a processing device receiving data representing at least two physical markers, each having a recognizable pattern thereon, positioned within a three-dimensional (3D) input space; and
one or more memory devices storing computer program code executable by the processing device, the processing device communicating with the one or more memory devices and executing the program code causing the apparatus at least to:

visually recognize the patterns on the at least two physical markers in the 3D input space partially based on reference images in a pattern library; and associate the patterns with one digital content.

35. An interactive input system, comprising:
a computing structure; and
an input device configured to detect a physical marker having a recognizable pattern thereon within a three-dimensional (3D) input space and to provide output to said computing structure, wherein said computing structure is configured to process said output of said input device to:
visually recognize said pattern on said marker in said 3D input space partially based on reference images in a pattern library;
modify an image presented on a display surface associated with said recognized pattern;
determine which digital content object presented on the display surface is closest to the marker on the display surface; and
select the digital content object closest to said marker to associate the digital content object with said marker.

36. The interactive input system of claim 35, wherein said computing device is configured to determine a distance between each digital content object and said marker.

37. The interactive input system of claim 36, wherein said computing device is configured to determine a first geometric center of said marker, and to determine a second geometric center of each of said at least one of digital content objects, and to measure the distance between said first geometric center and each second geometric center.

38. The interactive input system of claim 37, wherein said computing structure is further configured to determine if said marker is positioned from said digital content within a threshold distance.

39. A method, comprising:
detecting a marker having a unique pattern thereon within a three-dimensional (3D) input space;
visually recognizing said unique pattern on said marker partially based on reference images in a pattern library;
modifying an image presented on a display surface to display a marker associated with said marker when said unique pattern is visually recognized;
determining when said physical object is positioned within said 3D input space at a location to position the marker within a threshold distance of at least one digital content object presented on said display surface.

40. The method of claim 39, further comprising:
further modifying said image based on the velocity of said marker, wherein the determined velocity of said marker is based on projecting said marker on to a two-dimensional plane.

41. The method of claim 39, wherein the determining the velocity of said marker further comprises:
calculating a geometric center of said marker; and
calculating a geometric center of said at least one of digital content object.

42. The method of claim 41, wherein the determining the velocity of the said marker further comprises:
maintaining a timer; and
setting a time threshold for detecting the velocity of said marker.

43. An apparatus, comprising:
a processing device receiving data representing a marker having a recognizable pattern thereon and positioned within a three-dimensional (3D) input space; and
one or more memory devices storing computer program code executable by said processing device, said processing device communicating with said one or more memory devices and executing said program code causing said apparatus at least to:
present an image including at least one digital content object associated with said recognizable pattern on a display surface, presenting the image partially based on reference images in a pattern library, the reference images associated with said recognizable pattern.

44. The apparatus according to claim 43, wherein said processing device generates an indication signifying said marker is moving.

45. The apparatus according to claim 44, wherein said indication is a visual indicator.

46. An interactive input system, comprising:
a computing structure;
a display coupled to said computing structure, said display configured to present a three-dimensional (3D) image including at least one 3D digital content object; and
an input device configured to detect a physical marker having a recognizable pattern thereon within a three-dimensional (3D) input space and to provide output to said computing structure, wherein said recognizable pattern is associated with reference images in a pattern library, wherein said computing structure is configured to process said output of said input device to:
visually recognize said pattern on said marker partially based on said recognizable pattern associated with said reference images in said pattern library; and
select at least one digital content object closest to said marker to associate with said marker.

47. An interactive input system, comprising:
a computing structure; and
an input device configured to detect at least one marker having a recognizable pattern thereon within a three-dimensional (3D) input space and to provide output to said computing structure, wherein said computing structure is configured to process the output of the input device to:
visually recognize the pattern on the at least one marker in the 3D input space partially based on reference images in a pattern library;
determine digital content associated with the recognized pattern;
detect manipulation of the at least one marker in the 3D input space; and
manipulate the digital content associated with the at least one physical object in response to the detected manipulation of the at least one marker.

48. The interactive input system of claim 47, wherein said computing structure in response to a detected gesture is configured to one of (i) change associated digital content, (ii) merge associated digital content, (iii) clone associated digital content, (iv) disassociate digital content, (v) associates digital content, and (vi) rotate digital content.

* * * * *